(12) United States Patent
Fujiwara et al.

(10) Patent No.: US 8,931,368 B2
(45) Date of Patent: Jan. 13, 2015

(54) VEHICULAR OPERATING PEDAL DEVICE WITH LOAD SENSOR AND OPERATING DEVICE WITH LOAD SENSOR

(71) Applicants: Noboru Fujiwara, Toyota (JP); Hiroyuki Amano, Toyota (JP)

(72) Inventors: Noboru Fujiwara, Toyota (JP); Hiroyuki Amano, Toyota (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 0 days.

(21) Appl. No.: 13/828,428

(22) Filed: Mar. 14, 2013

(65) Prior Publication Data

US 2013/0269472 A1 Oct. 17, 2013

Related U.S. Application Data

(62) Division of application No. 11/980,674, filed on Oct. 31, 2007, now abandoned.

(30) Foreign Application Priority Data

Mar. 16, 2007 (JP) ................. 2007-067943
Jun. 5, 2007 (JP) ................. 2007-149198

(51) Int. Cl.
*G05G 1/30* (2008.04)
*B60T 7/06* (2006.01)
*G01L 1/22* (2006.01)
(Continued)

(52) U.S. Cl.
CPC ............... *B60T 7/06* (2013.01); *G01L 1/2237* (2013.01); *G01L 5/225* (2013.01); *G05G 1/487* (2013.01); *G05G 1/38* (2013.01)
USPC ............................ 74/512; 74/560

(58) Field of Classification Search
USPC ......... 74/512–514, 560, 516–518; 200/61.89, 200/86.5; 73/862.541, 132
See application file for complete search history.

(56) References Cited

U.S. PATENT DOCUMENTS 2,884,803 A 5/1959 Willis
3,052,130 A 9/1962 Kellogg et al.
(Continued)

FOREIGN PATENT DOCUMENTS

CN 1701219 A 11/2005
EP 1 557 653 7/2005
(Continued)

OTHER PUBLICATIONS

U.S. Appl. No. 13/828,045, filed Mar. 14, 2013.
(Continued)

*Primary Examiner* — Daniel Yabut
(74) *Attorney, Agent, or Firm* — Finnegan, Henderson, Farabow, Garrett & Dunner, LLP

(57) ABSTRACT

A clevis pin (connecting pin) (26) is inserted into a clearance hole (72), and is displaceable relative to an operating pedal (16). A pivotal moving link (68) is disposed between the clevis pin (26) and a sensor pin (64) of a load sensor (30). A reaction force applied from the clevis pin (26) to the load sensor (30) always acts in a substantially constant direction (substantially leftward in FIG. 1A) even if the operating pedal (16) and an operating rod (22) are pivoted relatively around the axis of the clevis pin (26) in accordance with the depressing operation of the operating pedal (16). Thus, the detecting accuracy of the load sensor (30) is heightened, and variation in detecting accuracy is prevented, rendering the high reliability.

8 Claims, 24 Drawing Sheets

(51) Int. Cl.
*G01L 5/22* (2006.01)
*G05G 1/487* (2008.04)
*G05G 1/38* (2008.04)

(56) References Cited

U.S. PATENT DOCUMENTS

| | | | |
|---|---|---|---|
| 3,142,199 A | 7/1964 | Burton et al. | |
| 3,219,775 A | 11/1965 | Carpenter | |
| 3,766,342 A | 10/1973 | Stadelmann | |
| 3,858,457 A * | 1/1975 | Mathues | 74/512 |
| 3,861,236 A | 1/1975 | Ramage | |
| 3,988,945 A | 11/1976 | Fasano | |
| 4,615,235 A * | 10/1986 | Horvath | 74/516 |
| 4,655,628 A | 4/1987 | Parker | |
| 4,978,177 A | 12/1990 | Ingraham | |
| 5,217,280 A | 6/1993 | Nykerk et al. | |
| 5,563,355 A | 10/1996 | Pluta et al. | |
| 5,771,752 A * | 6/1998 | Cicotte | 74/512 |
| 5,823,064 A * | 10/1998 | Cicotte | 74/512 |
| 5,964,122 A | 10/1999 | Bonnard et al. | |
| 5,970,817 A | 10/1999 | Ichibu | |
| 6,234,290 B1 | 5/2001 | Drexl et al. | |
| 6,655,199 B1 | 12/2003 | Smith | |
| 7,017,441 B2 * | 3/2006 | Hayashihara et al. | 74/512 |
| 7,134,327 B2 | 11/2006 | Saito et al. | |
| 7,328,933 B2 | 2/2008 | Vitale et al. | |
| 7,448,296 B2 * | 11/2008 | Fukase | 74/516 |
| 7,614,320 B2 * | 11/2009 | Fukase | 74/512 |
| 7,712,371 B2 | 5/2010 | Fujiwara | |
| 8,333,130 B2 | 12/2012 | Fujiwara | |
| 2003/0056616 A1 | 3/2003 | Matsumoto et al. | |
| 2003/0200863 A1 | 10/2003 | Dreischarf et al. | |
| 2005/0172753 A1 | 8/2005 | Fujiwara | |
| 2007/0221009 A1 * | 9/2007 | Fujiwara | 74/512 |
| 2008/0223171 A1 | 9/2008 | Fujiwara et al. | |
| 2008/0250894 A1 | 10/2008 | Fujiwara et al. | |

FOREIGN PATENT DOCUMENTS

| | | |
|---|---|---|
| EP | 1 577 184 | 9/2005 |
| EP | 1 591 331 | 11/2005 |
| JP | 11115699 A * | 4/1999 |
| JP | 11 255084 | 9/1999 |

OTHER PUBLICATIONS

U.S. Appl. No. 13/838,045, filed Mar. 14, 2013.
U.S. Appl. No. 13/828,282, filed Mar. 14, 2013.
Preliminary Amendment filed Mar. 14, 2013, in U.S. Appl. No. 13/828,045.
Preliminary Amendment filed Mar. 14, 2013 in U.S. Appl. No. 13/628,282.
U.S. Appl. No. 12/071,623, filed Feb. 25, 2008.
Request for Continued Examination filed May 17, 2012 and Amendment After Final filed Feb. 17, 2012 in U.S. Appl. No. 12/071,623.
"hollow." Collins English Dictionary—Complete & Unabridged 10$^{th}$ Edition, HarperCollins Publishers, May 24, 2011, <Dictionary.com http://dictionary.reference.com/browse/hollow>.
Chinese Office Action dated Jul. 29, 2010.
European Search Report dated Mar. 24, 2009.
Office Action for U.S. Appl. No. 13/828,282 mailed May 22, 2014.

* cited by examiner

VEHICULAR OPERATING PEDAL DEVICE WITH LOAD SENSOR AND OPERATING DEVICE WITH LOAD SENSOR

CROSS-REFERENCE TO RELATED APPLICATIONS

This is a division of application Ser. No. 11/980,674, filed Oct. 31, 2007, which claims Paris Convention priority of both Japanese Patent Application No. 2007-067943 filed on Mar. 16, 2007 and Japanese Patent Application No. 2007-149198 filed on Jun. 5, 2007, all of which are hereby incorporated by reference.

BACKGROUND OF THE INVENTION

1. Field of the Invention

This invention relates to an operating device, such as an operating pedal device for a vehicle, and more particularly, to an improvement in the operating device with a load sensor electrically detecting an operating force.

2. Description of the Related Art

A following device is known as an operating device provided with or equipped with a load sensor. This operating device with load sensor includes (a) an operating member operated to be moved, (b) a reaction force member to which an operating force of the operating member is transmitted, to which a reaction force corresponding to the operating force is acted, (c) at least one pivotal movement connecting portion that is disposed between the operating member and the reaction force member, to connect a pair of members to be relatively pivotable around a connecting pin, and to transmit an operating force through the connecting pin, and (d) a load sensor electrically detecting an operating force.

A brake pedal device for a vehicle disclosed in a following Patent Document 1 is an example of such the operating device with a load sensor. A push rod (i.e., a reaction force member) protruding from a master cylinder is connected to a connecting pin projected on a side portion of an operating pedal to be relatively movable in an axial direction. A displacing amount of the push rod displacing relative to the connecting pin resisting the urging force of a spring is detected by a sensor. Patent Document 1: U.S. Pat. No. 5,563,355

However, in the device disclosed by Patent Document 1, because the push rod is required to have a slotted opening for the relatively movable connection, a general push rod cannot be used for this device without being changed. Additionally, in accordance with the depressing operation of the operating pedal, the push rod pivots relative to the connecting pin. Therefore, a spring that biases or urges the push rod and a sensor that detects the displaced amount are also required to be arranged to pivot relative to the connecting pin, thus making the structure of the device complex. Still additionally, because the push rod, the spring and the sensor are disposed beside the operating pedal, especially a brake pedal is required to have a sturdy structure to secure a stable operating state, thus resulting in increase in both size and cost as a whole.

In contrast, a technique, though not yet well known, for compactly arranging a load sensor at a connecting position of a clevis pin has been proposed as shown in FIG. 25. FIGS. 25A and 25B show an operating pedal device 200 used in a service brake for a vehicle, of which FIG. 25A is a front view thereof, and FIG. 25B is an enlarged view along line XXVA-XXVA of FIG. 25A. A pedal support 12 fixed integrally to a vehicle body has a plate-like operating pedal 16 disposed pivotably around the axis of a substantially horizontal support shaft 14. The operating pedal 16 is depressed with the foot of a driver in accordance with braking instructions. A pad 18 is disposed at a lower end of the operating pedal 16, and an operating rod 22 of a brake booster is connected to a middle portion of the operating pedal 16 by a pivotal movement connecting portion 20.

The pivotal movement connecting portion 20 is composed of a U-shaped clevis 24 fixed integrally to an end of the operating rod 22 by a screw for example, and a clevis pin 26 disposed on the operating pedal 16 to be parallel to the support shaft 14. The operating rod 22 and the operating pedal 16 are connected to be relatively pivotable around the axis of the clevis pin 26. The clevis pin 26, corresponding to a claimed connecting pin, has axial ends projecting sideways from the operating pedal 16, and is held not to slip off from the U-shaped clevis 24 by a snap ring or a retaining pin.

An output corresponding to the operating force of the operating pedal 16 is transmitted to the operating rod 22 through the pivotal movement connecting portion 20, and a reaction force corresponding to the output is acted i.e., allowed to act by a brake booster. The operating rod 22 corresponds to a claimed reaction force member. If the operating pedal device is of a by-wire type which electrically controls a wheel brake, a reaction force member in which a predetermined reaction force is acted by a reaction force mechanism for example, is connected instead of the operating rod 22.

The operating pedal 16 has a sensor attaching hole 202 greater in diameter than the clevis pin 26 at a connecting position with the clevis pin 26. A load sensor 30 is disposed in an annular space formed between the sensor attaching hole 202 and the clevis pin 26. The load sensor 30 is composed of a cylindrical deforming member 32, an annular member 34 disposed radially outside, i.e., on an outer periphery surface of the deforming member 32, and a shaft-like member 36 disposed radially inside of, i.e., on an inner periphery surface of the deforming member 32. The load sensor 30 is used to detect a load applied to the deforming member 32 in the radial direction thereof. The annular member 34, corresponding to a claimed main body member, is integrally attached to a sensor attaching hole 202 with a predetermined posture (phase) by a press fitting or by use of a bolt or a leaf spring, and integrally holds one axial end (i.e., an upper end in FIG. 25B) of the deforming member 32 by welding for example.

The shaft-like member 36 integrally holds other axial end (i.e., a lower end in FIG. 25B) of the deforming member 32 by welding for example, and has a through-hole 38 formed in an axis part through which the clevis pin 26 passes. The clevis pin 26, the through-hole 38 and the clevis 24 are constructed to be relatively rotatable, so that the member having less friction is relatively pivoted in accordance with the depressing operation of the operating pedal 16. However, to reduce friction, bearings or the like may be disposed therebetween, if necessary.

Thus, the annular member 34 and the shaft-like member 36 are mutually connected through the deforming member 32. If the load is externally applied in the radial direction, i.e., in the direction perpendicular to the axis is nearly zero, the members 32, 34 and 36 are held to be substantially concentric, i.e., coaxially with the axis of the clevis pin 26. On the other hand, if the load is radially applied between the annular member 34 and the shaft-like member 36 by the reaction force of the operating rod 22 in accordance with the depressing operation of the operating pedal 16, the deforming member 32 undergoes a shear strain. As a result, the annular member 34 fitted to the operating pedal 16 displaces in a direction approaching the operating rod 22 (i.e., leftward in FIG. 25) relatively with respect to the shaft-like member 36.

An annular space is provided between the annular member 34 and the shaft-like member 36 to allow the annular member 34 and the shaft-like member 36 to radially displace relative to each other, or to allow the deforming member 32 to undergo the shear strain. The deforming member 32 made of a metallic material such as ferritic stainless steel, can be elastically deformed by receiving a radial load, and it undergoes the shear strain in accordance with the operating force generated by depressing the operating pedal 16.

To detect the shear strain of the deforming member 32, strain detecting elements such as strain resistive elements are attached to an outer or inner circumferential surface of the deforming member 32, and they are connected to a control circuit section of a vehicle through a wire harness 56. The operating force of the depressing operation can be detected based on an electric signal output from the strain detecting elements.

In the vehicular operating pedal device 200 thus constructed, in the pivotal movement connecting portion 20 which transmits an operating force applied onto the operating pedal 16 to the operating rod 22, a sensor attaching hole 202 is formed on the operating pedal 16 pivotably connected relative to the operating rod 22 via the clevis pin 26. The hollow cylindrical load sensor 30 is disposed in an annular space formed between the sensor attaching hole 202 and the clevis pin 26. Therefore, with the rotating moment such as twist which may be applied to the load detecting element 30 suppressed, the whole of the operating pedal device 200 can be formed in simple and compact structure. Additionally, relating members such as the operating rod 22 and the clevis 24 which are the same as those used in the conventional pedal device can be used, so that the operating pedal device 200 can be produced at low cost.

However, even in the thus structured operating pedal device 200, when the operating pedal 16 is pivoted around the supporting shaft 14 in accordance with the depressing operation thereof, the operating rod 22 and the operating pedal 16 are also relatively pivoted around the axis of the clevis pin 26. As a result, an acting position of the load applied to the deforming member 32, i.e., a deforming direction of the deforming member 32 varies, so that a detected value may be varied in response to variation in the load acting position. Size and a setting position of the strain detecting element are determined to detect such deformation, regardless of variation i.e., shift of the varying position of the deforming member 32. However, due to continuous movement of the detecting position in the circumferential direction, there is a problem that the deforming form of the deforming member 32 is complex and easily varies. For this reason, securing a high detecting accuracy may be difficult depending on the relative positional relationship between the operating rod 22 and the operating pedal 16.

The present invention has been made in consideration of these circumstances. Therefore, an object of the present invention is, in an operating device that has a load sensor disposed in a pivotal movement connecting portion and that is capable of detecting an operating force transmitted via a connecting pin, to improve the detecting accuracy of the load sensor. In the operating device, a shaft-like member and a main body member (i.e., an annular member 34 of FIG. 25B) are relatively changed in the position to each other in the direction perpendicular to the axis of the shaft-like member, and the load sensor electrically detects an operating force based on this change.

SUMMARY OF THE INVENTION

To achieve the above object, a vehicular operating pedal device with a load sensor according to a first aspect of the present invention is comprised of (a) an operating pedal movably disposed on a pedal support fixed to a vehicle and depressed by a driver; (b) a reaction force member to which an operating force of the operating pedal is transmitted and on which a reaction force corresponding to the operating force is acted; (c) a link type depressing-force transmitting mechanism placed between the operating pedal and the reaction force member and has a pair of members connected through a connecting pin relatively pivotably i.e. to be relatively rotatable, and constituting a pivotal movement connecting portion transmitting the operating force through the connecting pin; and (d) a load sensor, disposed in the pivotal movement connecting portion to receive the load in a predetermined direction for electrically detecting the operating force, regardless of variation of the direction of a reaction force relative to the operating pedal input from the reaction force member in accordance with a depression of the operating pedal.

A second aspect is, in the vehicular operating pedal device with the load sensor of the first aspect, is comprised of (a) an operating pedal movably disposed on a pedal support fixed to a vehicle and depressed by a driver; (b) a reaction force member to which an operating force of the operating pedal is transmitted and on which a reaction force corresponding to the operating force is acted; (c) at least one pivotal movement connecting portion, placed between the operating member and the reaction force member, to connect a pair of members relatively pivotably i.e. to be relatively rotatable around a connecting pin, and to transmit the operating force through the connecting pin; and (d) a load sensor electrically detecting the operating force; wherein (e) the load sensor includes a shaft-like member, a main body member disposed to be relatively displaced to the shaft-like member in a direction perpendicular to an axis thereof, a deforming member spanned over the shaft-like member and the main body member, and strain detecting elements fixed to the deforming member, the strain detecting elements detecting a deformation caused in the deforming member by allowing a relative displacement between the shaft-like member and the main body member in the direction perpendicular to the axis of the shaft-like member based on the reaction force; (f) the load sensor is disposed such that one of the shaft-like member and the main body member is fixed to one of the sensor arranging member of the pair of members connected through the connecting pin in the pivotal movement connecting portion; (g) the connecting pin is displaceable relative to the sensor arranging member; and (h) an orientation converting mechanism, disposed between the connecting pin and the other of the shaft-like member and the main body member, to mechanically change a direction of the operating force applied from the connecting pin or the reaction force so that the load acts on the load sensor in a constant direction.

A third aspect is, in the vehicular operating pedal device with the load sensor of the second aspect, featured by that the orientation converting mechanism is at least one pivotal moving link which is disposed on the sensor arranging member pivotably around the supporting pin parallel to the connecting pin, and to which the connecting pin and the other of the shaft-like member and the main body member of the load sensor are connected to be pivoted around the supporting pin based on the operating force applied from the connecting pin or the reaction force thereto.

A fourth aspect is, in the vehicular operating pedal device with the load sensor of the second aspect, featured by that the orientation converting mechanism includes (a) a connecting pin guide disposed on the sensor arranging member to regulate a movement path of the connecting pin; and (b) an interlocking member displacing the other of the shaft-like member and the main body member of the load sensor in the predetermined direction in accordance with a movement of the connecting pin.

A fifth aspect is, in the vehicular operating pedal device with the load sensor of the fourth aspect, featured by that (a) the connecting pin guide is disposed to move the connecting pin in the predetermined direction, and (b) the interlocking member is a linearly moving link connecting the connecting pin and the other of the shaft-like member and the main body member of the load sensor.

A sixth aspect is in the vehicular operating pedal device with the load sensor of the fourth aspect, featured by that (a) the connecting pin guide is disposed to move the connecting pin in the predetermined direction, and (b) the interlocking member is a sliding member moved in the predetermined direction together with the connecting pin.

A seventh aspect is, in the vehicular operating pedal device with the load sensor of fourth aspect, featured by that the interlocking member includes (a) an intermediate sliding member moved in the constant direction by an intermediate guide disposed on the sensor arranging member, and (b) an interlocking link connecting the intermediate sliding member and the connecting pin.

A eighth aspect is, in the vehicular operating pedal device with the load sensor of any one of the second to seventh aspects, featured by that (a) the sensor arranging member is a plate-like member to be connected to the reaction force member relatively pivotably around the connecting pin, and provided with a sensor attaching hole passing therethrough; (b) the load sensor is disposed in the sensor attaching hole such that the main body member is integrally fixed to the sensor attaching hole, and a sensor pin provided on the axis of the shaft-like member projects from both axial sides of the sensor attaching hole; and (c) the orientation converting mechanism is disposed between both axial ends of the sensor pin and the connecting pin.

A ninth aspect is, in the vehicular operating pedal device with the load sensor of any one of the second to eighth aspects, featured by that (a) the operating pedal is disposed on the pedal support pivotably around a support axis, and (b) the operating pedal serves as the sensor arranging member.

A tenth aspect is, in the vehicular operating pedal device with the load sensor of any one of the second to eighth aspects, featured by that (a) an intermediate lever, disposed on the pedal support, to be pivotably connected to the operating pedal through the connecting link and to be connected to the reaction force member through the pivotal movement connecting portion, and (b) the intermediate lever serves as the sensor arranging member.

A eleventh aspect is, in the vehicular operating pedal device with the load sensor of any one of the second to tenth aspects, featured by that the deforming member has a hollow cylindrical shape, one axial end and other axial end of which are integrally fixed to the main body member and the shaft-like member, respectively; and the shaft-like member detects a shear strain caused in the deforming member by allowing a relative displacement between the main body member and based on the reaction force.

A twelfth aspect is, in the vehicular operating pedal device with the load sensor of any one of the second to tenth aspects, featured by that the deforming member has a hollow cylindrical shape; the main body member integrally holds a part of the deforming member around a center line thereof, and the shaft-like member is inserted into a cylindrical inner part of the deforming member; and the strain detecting element detects a tensile strain caused in the deforming member by allowing a relative displacement between the main body member and the shaft-like member based on the reaction force.

An operating device with a load sensor according to a thirteenth aspect of the present invention is comprised of (a) an operating member moved to be operated; (b) a reaction force member to which an operating force of the operating member is transmitted and on which a reaction force corresponding to the operating force is acted; (c) at least one pivotal movement connecting portion, placed between the operating member and the reaction force member, to connect a pair of members relatively pivotably i.e. to be relatively rotatable around a connecting pin, to thereby transmit the operating force through the connecting pin; and (d) a load sensor electrically detecting the operating force; wherein (e) the load sensor includes a shaft-like member, a main body member disposed to be relatively displaced to the shaft-like member in a direction perpendicular to an axis thereof, a deforming member spanned over the shaft-like member and the main body member, and strain detecting elements fixed to the deforming member, the strain detecting elements detecting a deformation caused in the deforming member by allowing a relative displacement between the shaft-like member and the main body member in the direction perpendicular to the axis of the shaft-like member based on the reaction force; (f) the load sensor is disposed such that one of the shaft-like member and the main body member is fixed to one of the sensor arranging member of the pair of members connected through the connecting pin in the pivotal movement connecting portion; (g) the connecting pin is displaceable relative to the sensor arranging member; and (h) an orientation converting mechanism, disposed between the connecting pin and the other of the shaft-like member and the main body member of the load sensor, to mechanically change a direction of the operating force applied from the connecting pin or the reaction force so that the load acts on the load sensor in a constant direction.

A fourteenth aspect is, in the vehicular operating pedal device with the load sensor of the first aspect, featured by that featured by that (a) an operating pedal movably disposed on a pedal support fixed to a vehicle and depressed by a driver; (b) a reaction force member to which an operating force of the operating pedal is transmitted and on which a reaction force corresponding to the operating force is acted; (c) at least one pivotal movement connecting portion, placed between the operating member and the reaction force member, to connect a pair of members relatively pivotably i.e. to be relatively rotatable around a connecting pin to thereby transmit the operating force through the connecting pin; and (d) a load sensor electrically detecting the operating; wherein (e) the load sensor includes a shaft-like member, a main body member disposed to be relatively displaced to the shaft-like member in a direction perpendicular to an axis thereof, a deforming member spanned over the shaft-like member and the main body member, and strain detecting elements fixed to the deforming member, the strain detecting elements detecting a deformation caused in the deforming member by allowing a relative displacement between the shaft-like member and the main body member in the direction perpendicular to the axis of the shaft-like member based on the reaction force; (f) at least one pivotal moving link which is disposed in the pivotal movement connecting portion on one of sensor arranging members of the pair of members pivotably connected through the connecting pin around a first supporting pin parallel to the connecting pin, and to which the connecting pin displaceable relative to the sensor arranging member is connected relatively pivotably around the first supporting pin by the operating force applied from the connecting pin or by the reaction force; (g) a swinging lever disposed on the sensor arranging member swingably around a second supporting pin parallel to the connecting pin; and (h) one of the shaft-like member and the main body member of the load sensor is connected to the pivotal moving link, and the other of the shaft-like member and the main body member is connected to the swinging lever.

A fifteenth aspect is, in the vehicular operating pedal device with the load sensor of the fourteenth aspect, featured by that, when viewed from a direction of the axis of the first supporting pin, the second supporting pin is disposed such that a straight line connecting an axis of the second supporting pin and an axis of other of the main body member and the shaft-like member connected to the swinging lever, intersects with a straight line connecting an axis of the first supporting pin and an axis of the one of the main body member and the shaft-like member connected to the swinging lever at substantially right angle.

A sixteenth aspect is, in the vehicular operating pedal device with the load sensor of the fourteenth or fifteenth aspect, featured by that the second supporting pin is disposed at a position where, with the pivotal moving link pivoted around the first supporting pin in accordance with a depression of the operating pedal, a tensile force is acted on the swinging lever.

A seventeenth aspect is, in the vehicular operating pedal device with the load sensor of any one of the fourteenth to sixteenth aspects, featured by that (a) the sensor arranging member is a plate-like member pivotably connected relative to the reaction force member through the pivotal movement connecting portion, and is provided with a sensor attaching hole passing therethrough; (b) the load sensor is disposed in the sensor housing hole with a predetermined clearance, the main body member projects from both axial sides of the sensor housing hole, and a sensor pin passing through the axis of the shaft-like member is disposed to project from both axial sides of the main body member; and (c) a pair of the pivotal moving links and a pair of the swinging levers are disposed at both axial sides of the plate-like sensor arranging member, respectively, and are connected to both axial ends of the main body member or the sensor pin, respectively.

A eighteenth aspect is, in the vehicular operating pedal device with the load sensor of any one of the fourteenth to seventeenth aspects, featured by that (a) the operating pedal is disposed on the pedal support pivotably around a supporting axis, and (b) the operating pedal serves as the sensor arranging member.

A nineteenth aspect is, in the vehicular operating pedal device with the load sensor of any one of the fourteenth to seventeenth aspects, featured by that (a) an intermediate lever disposed pivotably on the pedal support, connected to the operating pedal through the connecting link, and connected to the reaction force member through the pivotal movement connecting portion, and (b) the intermediate lever serves as the sensor arranging member.

A twentieth aspect is, in the vehicular operating pedal device with the load sensor of any one of the fourteenth to nineteenth aspects, featured by that the deforming member has a hollow cylindrical shape; one axial end and the other axial end of the cylindrical deforming member are integrally fixed to the main body member and the shaft-like member, respectively; and the strain detecting elements detect a shear strain caused in the deforming member based on the relative displacement between the main body member and the shaft-like member by the reaction force.

An operating device with a load sensor according to a twenty-first aspect of the present invention is comprised of (a) an operating member that is moved to be operated; (b) a reaction force member to which an operating force of the operating member is transmitted and on which a reaction force corresponding to the operating force is acted; (c) at least one pivotal movement connecting portion, placed between the operating member and the reaction force member, to connect a pair of members relatively pivotably around a connecting pin, and to transmit the operating force through the connecting pin; and (d) a load sensor electrically detecting the operating force, and including a shaft-like member, a main body member disposed to be relatively displaced to the shaft-like member in a direction perpendicular to an axis thereof, a deforming member spanned over the shaft-like member and the main body member, and strain detecting elements fixed to the deforming member, the strain detecting elements detecting a deformation caused in the deforming member by allowing a relative displacement between the shaft-like member and the main body member in the direction perpendicular to the axis of the shaft-like member based on the reaction force; (e) at least one pivotal moving link which is disposed in the pivotal movement connecting portion on one of sensor arranging members of the pair of members pivotably connected through the connecting pin around a first supporting pin parallel to the connecting pin, and to which the connecting pin displaceable relative to the sensor arranging member is connected relatively pivotably i.e. to be relatively rotatable around the first supporting pin by the operating force applied from the connecting pin or by the reaction force; (f) a swinging lever disposed on the sensor arranging member swingably around a second supporting pin parallel to the connecting pin; and (g) one of the shaft-like member and the main body member of the load sensor is connected to the pivotal moving link, and the other of the shaft-like member and the main body member is connected to the swinging lever.

In the vehicular operating pedal device with the load sensor according to the first aspect of the present invention, the link type depressing-force transmitting mechanism is placed between the operating pedal and the reaction force member, which has the pair of members relatively rotatably connected together through the connecting pin and constituting a pivotal movement connecting portion used to transmit the operating force through the connecting pin. Additionally, the load sensor electrically detecting the operating force is disposed on the pivotal movement connecting portion of the link type depressing-force transmitting mechanism to receive the load in the predetermined direction, despite the direction of the reaction force input from the reaction force member in accordance with the depressing operation of the operating pedal varies with respect to the operating pedal. Therefore, a deformed part of the deforming member is constantly or fixedly maintained, that is the deforming member deforms at the constant or fixed part. As a result, the detecting accuracy of the operating force is heightened, and variation in detecting accuracy is prevented, thus the high reliability being obtained.

In the vehicular operating pedal device with the load sensor according to the second aspect of the present invention, the load sensor electrically detecting the operating force based on the relative displacement of the main body member and the shaft-like member is disposed on the pivotal movement connecting portion of the predetermined sensor arranging member, and detects the operating force transmitted through the connecting pin of the pivotal movement connecting portion. Therefore, the whole device can be constructed simple and compact, for example, by disposing the load sensor in the sensor attaching hole formed in the sensor arranging member. Additionally, the relating members such as the rod and the clevis used here are the same as those of the conventional pedal device, so that the pedal device of the present invention can be constructed at low cost.

According to the second aspect of the present invention, the connecting pin is displaceable relative to the sensor arranging member, and the orientation converting mechanism is disposed between the connecting pin and the other of the shaft-like member and the main body member of the load sensor. Even if the sensor arranging member is relatively pivoted around the connecting pin in accordance with the depressing operation of the operating pedal, the operating force applied from the connecting pin or the reaction force acts on the load sensor from a predetermined direction. Therefore, the deformed part of the deforming member is constantly or fixedly maintained. As a result, the detecting accuracy of the operating force is heightened, and variation in detecting accuracy is prevented, thus the high reliability being obtained.

According to the third aspect of the present invention, the pivotal moving link serving as the orientation converting mechanism is sufficiently disposed pivotably around the supporting pin, and the other of the shaft-like member and the main body member of the load sensor and the connecting pin are sufficiently connected to the pivotal moving links, respectively. For this reason, the device can be constructed simple in structure and low in cost, and can be constructed compact in the forward and backward directions of the vehicle in which the operating pedal is depressed.

Likewise, in the fifth and sixth aspects of the present invention, all that is required are, with the connecting pin guide moving the connecting pin in the constant direction provided; to connect the connecting pin and the other of the shaft-like member and the main body member of the load sensor by the linearly moving link, or to provide the sliding member moved together with the connecting pin in the constant direction. Therefore, the device can be constructed simple in structure and low in cost as that in the third aspect of the present invention.

According to the seventh aspect of the present invention, the intermediate sliding member moved in the constant direction by the intermediate guide and the connecting pin are connected by the interlocking link. The load is transmitted from the intermediate sliding member to the other of the shaft-like member and the main body member of the load sensor directly, or indirectly via the linearly moving link or the sliding member, etc. Therefore, the design freedom increases in the connecting position of the connecting pin or the disposing position of the load sensor.

According to the eighth aspect of the present invention, the load sensor is disposed in the member pivotably connected relative to the reaction force member around the connecting pin serves as the sensor arranging member. Therefore, the load sensor detects the final operating force (output) transmitted from the connecting pin to the reaction force member. For example, the braking force generated when the hydraulic brake or the like is mechanically operated through the reaction force member can be detected with high accuracy. Additionally, the main body member is integrally fixed to the sensor attaching hole formed in the sensor arranging member, and the orientation converting mechanism is disposed between the connecting pin and both axial ends of the sensor pin being disposed on the axis of the shaft-like member and projecting from both axial sides of the sensor attaching hole. Therefore, the device can be constructed simple and compact. In addition, with the load (reaction force) of the connecting pin substantially evenly applied to the shaft-like member of the load sensor, the detecting accuracy is further heightened.

The operating device with the load sensor according to the thirteenth aspect of the present invention is not limited to a vehicular operating pedal device, but can be applied to various operating devices such as operating pedal devices or manual operation devices other than the vehicular operating pedal device. However, owing to similarity of the structure or the arrangement of the load sensor or the orientation converting mechanism to that of the vehicular operating pedal device according to the first aspect of the present invention, substantially the same operation and effect as that in the first aspect of the present invention can be obtained. In other words, the first aspect of the present invention can be regarded as one embodiment according to the thirteenth aspect of the present invention. The operating pedal corresponds to the claimed operating member.

In the vehicular operating pedal device with the load sensor according to the fourteenth aspect of the present invention, the load sensor electrically detecting the operating force based on the relative displacement between the main body member and the shaft-like member, is disposed at the pivotal movement connecting portion of the predetermined sensor arranging member. The operating force transmitted through the connecting pin of the pivotal movement connecting portion is detected. Therefore, the whole device can be constructed simple and compact, for example, by disposing the load sensor in the sensor housing hole formed in the sensor arranging member. Additionally, the relating members such as the rod and the clevis used here are the same as those of the conventional pedal device, so that the pedal device of the present invention can be constructed at low cost.

According to the fourteenth aspect of the present invention, the pivotal moving link is disposed on the sensor arranging member pivotably around the first supporting pin, to which the connecting pin is connected relatively pivotably. With the swinging lever disposed swingably around the second supporting pin, one of the shaft-like member and the main body member of the load sensor is connected to the pivotal moving link, whereas the other of the shaft-like member and the main body member is connected to the swinging lever.

For this reason, even if the sensor arranging member is relatively pivoted around the connecting pin in accordance with the depressing operation of the operating pedal, the reaction force applied from the connecting pin to the load sensor through the pivotal moving link or the operating force applied from the second connecting to the load sensor through the swinging lever is acted on the substantially constant or fixed direction. Thus, the deformed part of the deforming member is constantly or fixedly maintained. As a result, the detecting accuracy of the operating force is heightened, and variation in detecting accuracy is prevented, thus the high reliability being obtained.

Connecting the other of the shaft-like member and the main body member to the swinging lever can absorb dimensional errors or assembling errors of these members to ease the desired dimensional precision. Thus, the device can be constructed at lower cost, compared with the case in which the elements are integrally fixed to the sensor arranging member.

According to the fifteenth aspect of the present invention, when viewed from a direction of the axis of the first supporting pin, the second supporting pin is disposed such that a straight line connecting an axis of the second supporting pin and an axis of one of the main body member and the shaft-like member connected to the swinging lever, intersects with a straight line connecting an axis of the second supporting pin and an axis of the other of the main body member and the shaft-like member connected to the swinging lever at substantially right angle. In other words, the second supporting pin is disposed on or near the acting line of the load (reaction force) applied from the connecting pin to the load sensor through the pivotal moving link. Therefore, with the efficient receipt of the load by the second supporting pin, the device can be constructed simple, compact, and low in cost.

According to the sixteenth aspect of the present invention, the second supporting pin is disposed at a position where, with the pivotal moving link pivoted around the first supporting pin in accordance with a depression of the operating pedal, a tensile force acts on the swinging lever. Therefore, there is no fear of an excessive load acting on the swinging lever or the second supporting pin, so that the device can be constructed simple, compact, and low in cost. In other words, if the second supporting pin is disposed such that the compressive load acts on the swinging lever, an excessive load may act on the swinging lever or on the second supporting pin by a servo action of, for example, a toggle link mechanism, depending on the positional relationship of the second pin with the pivotal moving link.

According to the seventeenth aspect of the present invention, the load sensor is disposed in the member serving as the sensor arranging member which is pivotably connected relative to the reaction force member through the pivotal movement connecting portion. Therefore, the load sensor can detects the final operating force (output) transmitted from the connecting pin to the reaction force member. For example, the braking force generated when the hydraulic brake or the like is mechanically operated through the reaction force member can be detected with high accuracy. The load sensor is disposed in the sensor housing hole formed in the sensor arranging member with the predetermined clearance. The pair of pivotal moving links and the pair of swinging levers are disposed at both axial sides of the plate-like sensor arranging member, respectively, and are connected to both axial ends of the main body member or axial both axial ends of the sensor pin is inserted along the axis of the shaft-like member, respectively. Therefore, not only the device can be constructed compact, but the rotating moment such as twist is prevented. Thus, the load sensor operates stably, thus further heighten the detecting accuracy.

The operating device with the load sensor according to the twenty-first aspect of the present invention is not limited to the vehicular operating pedal device, but can be applied to various operating devices such as operating pedal devices or manual operation devices other than the vehicular operating pedal device. However, owing to similarity of the structure of the load sensor or the arrangement using the pivotal moving link and the swinging lever to that of the vehicular operating pedal device according to the fourteenth aspect of the present invention, substantially the same operation and effect as that in the first aspect of the present invention can be obtained. The fourteenth aspect of the present invention can be regarded as one embodiment according to the twenty-first aspect of the present invention. The operating pedal corresponds to the claimed operating member.

The present invention is advantageously applied to a brake pedal device for a service brake, but it can also be applied to an operating pedal device for an accelerator or for a parking brake. The thirteenth and twenty-first aspects of the present invention can be applied to the various operating devices such as operating pedal devices other than a vehicle or manual operation devices. The reaction force member is, for example, an operating rod of a brake booster or a push rod of a brake master cylinder, and is structured to mechanically operate a wheel brake or the like. However, the present invention can also be applied to an electric (by-wire type) operation braking device that electrically controls a wheel brake or a driving unit in accordance with an operating force detected by a load sensor. In this case, a stroke simulator or a reaction force mechanism can be connected to the reaction force member to apply a predetermined reaction force thereto.

For example, a connecting part connecting the operating pedal and the reaction force member and a connecting part connecting the intermediate lever and the reaction force member are suitable as the pivotal movement connecting portion on which the load sensor is disposed. However, if a connecting link connecting the operating pedal and the intermediate lever is provided, a connecting part between the connecting link and the operating pedal or a connecting part between the connecting link and the intermediate lever may be used. The disposing position of the load sensor is appropriately selected.

Although the load sensors according to the eleventh, twelfth and twentieth aspects of the present invention include the hollow cylindrical deforming member, the shape of the deforming member can be appropriately selected when the present invention is embodied according to other aspects. For example, the deforming member may be formed in an elliptical shape in which at least a deformed part based on the relative displacement of the shaft-like member and the main body member is circularly arced. The load sensor is disposed such that the circularly arced part undergoes extensional deformation or flexural deformation when a tensile load or a compressive load is applied onto both ends of the circularly arced part. Additionally, a deforming member can be used, which assumes a doughnut shape corresponding to an annular space between the shaft-like member and the main body member and undergoes tensile deformation, compressional deformation, or flexural deformation based on the relative displacement between the shaft-like member and the main body member. Since the load (the operating force or the reaction force) is applied in the constant or fixed direction around the axis of the load sensor in the present invention, the direction of the relative displacement between the shaft-like member and the main body member is constant. Thus, the deforming members having various forms deformed by the relative displacement thereof can be employed.

The load sensor electrically detects a strain of the deforming member undergoing an elastic deformation by use of the strain detecting element, and converts this strain into the load, i.e., the operating force according to a predetermined map or operational equation. Although thin-film or thick-film semiconductor strain gauges or generally-used strain gauges are used as desirable examples of the strain resistive elements, piezoelectric elements or piezoelectric-crystal elements can also be used.

Preferably, in the load sensor, for example, the main body member is integrally fixed to the inside of the sensor attaching hole formed to pass through i.e., penetrate the plate-like sensor arranging member, the shaft-like member or the sensor pin provided on the axis thereof is disposed to project from both axial sides of the sensor attaching hole, and the orientation converting mechanism is disposed between the connecting pin and both axial ends of the shaft-like member or both axial ends of the sensor pin. However, other various modes can be employed. For example, the load sensor may be disposed on one side surface of the sensor arranging member, or the shaft-like member may be fixed to the sensor arranging member and the orientation converting mechanism may be disposed between the main body member and the connecting pin. There is a case where the sensor arranging member is composed of a pair of parallel plate-like members spaced by a predetermined distance and integrally connected together. In this case, following structure can be employed. For example, with the load sensor disposed between the pair of plate-like members, both axial ends of the shaft-like member are fixed to the plate-like member (the sensor arranging member), and the orientation converting mechanism is disposed between the main body member and the connecting pin.

For example, the pivotal moving link according to the third aspect of the present invention is disposed on the sensor arranging member pivotably around the supporting pin in its intermediate position, and the other member of the load sensor and the connecting pin are relatively pivotably connected thereto at both axial sides with intervening the supporting pin therebetween. However, the other member of the load sensor may be connected between the supporting pin and the connecting pin, or the connecting pin may be connected between the other member of the load sensor and the supporting pin. If the distance therebetween (the lever ratio) is properly set, the amplified or attenuated operating force can be detected.

For example, the connecting pin guide according to the fourth aspect of the present invention is constructed to pass through the sensor arranging member for allowing insertion of the connecting pin, and it can be comprised of an elongate hole linearly extended in a predetermined direction perpendicular to the center line of the load sensor. However, a guide rail or a guide rod which guides a sliding member in a predetermined direction may be used, to which the connecting pin is relatively rotatably connected.

According to the eighth aspect of the present invention, both axial ends of the sensor pin disposed on the axis of the shaft-like member project from the sensor attaching hole. For example, the sensor pin is constructed as an independent element i.e., a separated element, is allowed to pass through the through-hole formed in the shaft-like member. However, other various forms can be employed. For example, both axial ends of the shaft-like member functioning as the sensor pin project from the sensor attaching hole, and the solid cylindrical pin portions are projected on both end surfaces of the shaft-like member integrally therewith, respectively. If the sensor pin is constructed as the member independent from the shaft-like member, it may be disposed pivotably relative to the shaft-like member, or, alternatively, may be fixed integrally therewith.

For example, the load sensors according to the fourteenth to twenty-first aspects of the present invention are preferably disposed in the sensor housing hole formed in the plate-like sensor arranging member to pass therethrough with a clearance. However, the load sensor can be disposed on one side face of the sensor arranging member. Besides, other various modes can be employed. For example, if the sensor arranging member is composed of a pair of parallel plate-like members spaced by a predetermined distance and are integrally connected together, the load sensor may be disposed between the pair of plate-like members.

For example, the pivotal moving links according to the fourteenth to twenty-first aspects of the present invention are disposed on the sensor arranging member pivotably around the first supporting pin in its intermediate position, and one member of the load sensor and the connecting pin are relatively pivotably connected thereto at both sides with intervening the first supporting pin therebetween. However, the one member of the load sensor may be connected between the first supporting pin and the connecting pin, and the connecting pin may be connected between the one member of the load sensor and the first supporting pin. If the distance therebetween (the lever ratio) is properly set, the amplified or attenuated operating force can be detected.

The shaft-like member and the main body member of the load sensor according to the fourteenth to twenty-first aspects of the present invention are connected to one and other of the pivotal moving link and the swinging lever. However, other various modes can be employed. For example, the main body member may be integrally fixed to the pivotal moving link, and the shaft-like member may be connected to the swinging lever pivotably around the axis thereof. Alternatively, the main body member may be integrally fixed to the swinging lever, and the shaft-like member may be connected to the pivotal moving link rotatably around the axis thereof. The main body member may be disposed on the pivotal moving link pivotably around the axis thereof, and the shaft-like member may be integrally fixed to the swinging lever. Preferably, to absorb dimensional errors or assembling errors of the members or portions, one of them is preferably connected pivotably around the axis.

For example, according to the fifteenth aspect of the present invention, when viewed from a direction of the axis of the first supporting pin, the second supporting pin is disposed such that a straight line connecting an axis of the second supporting pin and an axis of one of the main body member and the shaft-like member connected to the swinging lever, intersects with a straight line connecting an axis of the second supporting pin and an axis of the other of the main body member and the shaft-like member connected to the swinging lever at substantially right angle. However, the disposing position of the second pin can be appropriately selected when the present invention is embodied according to the other aspects. When embodying the present invention according to the fifteenth aspect, the straight lines are not necessarily required to intersect at exactly right angle with each other. As long as these straight lines intersect with each other in the range of ±20 degrees with respect to right angle i.e., in the range from 70 degrees to 110 degrees, a sufficient effect can be obtained.

Although the second supporting pin is disposed at the position where the tensile force acts on the swinging lever according to the sixteenth aspect of the present invention, it can be disposed at a position where a pressing force acts on the swinging lever when the present invention is embodied according to the other aspects. In such a case, there is a possibility of an excessive load acting on the swinging lever and the second supporting pin in the same way as that in a toggle link mechanism. In view of this, preferably, the second supporting pin is disposed such that a straight line connecting the second supporting pin and one of the main body member and the shaft-like member connected to the swinging lever, intersects at substantially right angle with a straight line connecting the first supporting pin and the other of the main body member and the shaft-like member connected to the pivotal moving link, as that in the fifteenth aspect.

According to the seventeenth aspect of the present invention, both axial ends of the sensor pin disposed on the axis of the shaft-like member project from the main body member. For example, the sensor pin is constructed as an independent element i.e., a separated element, and is allowed to pass through the through-hole formed in the shaft-like member. However, other various forms can be employed. For example, both axial ends of the shaft-like member functioning as the sensor pin project from the main body member, and solid cylindrical pin portions are projected on both axial end surfaces of the shaft-like member integrally therewith, respectively. If the sensor pin is constructed as an element independent from the shaft-like member, it may be disposed pivotably relative to the shaft-like member, or, alternatively, may be formed integrally therewith.

According to the twentieth aspect of the present invention, the deforming member having a hollow cylindrical shape is integrally fixed to the main body member and the shaft-like member at one axial end and other axial end thereof, respectively, and undergoes the shear deformation in accordance with the relative displacement thereof. However, with a part of the cylindrical deforming member around the center line integrally fixed to the main body member, the shaft-like member may be disposed to pass through the inner cylindrical part of the deforming member. A tensile strain caused in the deforming member resulting from the relative displacement between the main body member and the shaft-like member based on the reaction force may be detected by the strain detecting element.

BRIEF DESCRIPTION OF THE DRAWINGS

FIG. 1 is a set of views showing one example of a vehicular operating pedal device for a service brake to which the present invention is applied, of which

FIG. 2 is a set of views showing a load sensor according to the embodiment of FIG. 1, of which

FIG. 3 is a set of views showing a state in which with depression of an operating pedal with a foot from the state of FIGS. 2A and 2B, a deforming member undergoes a shear strain by the reaction force of an operating rod, of which

FIG. 7 is a set of views showing still another embodiment, of which

FIG. 9 is a set of views showing still another embodiment, of which

FIG. 11 is a set of views showing still another embodiment, of which

FIG. 13 is a set of views showing still another embodiment in which the present invention is applied to a vehicular operating pedal device including an intermediate lever, and the load sensor and the orientation converting mechanism shown in FIGS. 1A and 1B are disposed at a pivotal movement connecting portion between the intermediate lever and the connecting link.

FIG. 14 is a set of views, corresponding to FIG. 2, explaining another example of the load sensor, of which

FIG. 15 is a set of views showing a state with depression of the operating pedal by a foot from the state of FIG. 14, the deforming member is stretched and deformed into an oval by the reaction force of the operating rod.

FIG. 16 is a set of views showing an example of a vehicular operating pedal device for a service brake according to still another embodiment of the present invention.

FIG. 17 is a set of views showing the load sensor of the embodiment shown in FIGS. 16A and 16B, of which

FIG. 18 is a set of views showing a state with depression of the operating pedal by a foot from the state of FIG. 17, the deforming member is subjected to shear strain by the reaction force of the operating rod.

FIG. 22 is a set of views showing still another embodiment in which a load sensor is disposed at a pivotal movement connecting portion between an intermediate lever and a connecting link.

FIG. 23 is a set of views, correspond to FIG. 17, explaining another example of the load sensor, of which

FIG. 24 is a set of views showing a state with depression of the operating pedal from the state of FIGS. 23A and 23B, the deforming member is stretched and deformed into an oval by the reaction force of the operating rod.

FIG. 25 is a set of views explaining the background art of the present invention.

DETAILED DESCRIPTION OF PREFERRED EMBODIMENTS OF THE INVENTION

Embodiments of the present invention will be hereinafter described in detail with reference to the attached drawings.

Figure 1A:
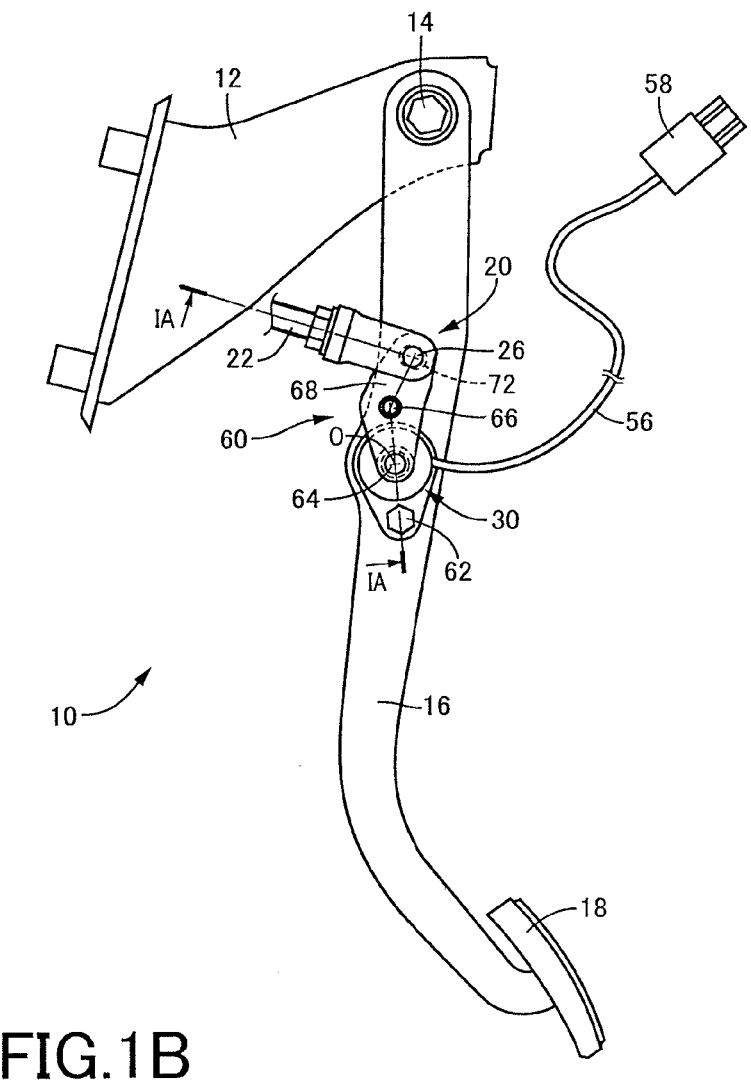
FIG. 1A is a front view.
Figure 1B:
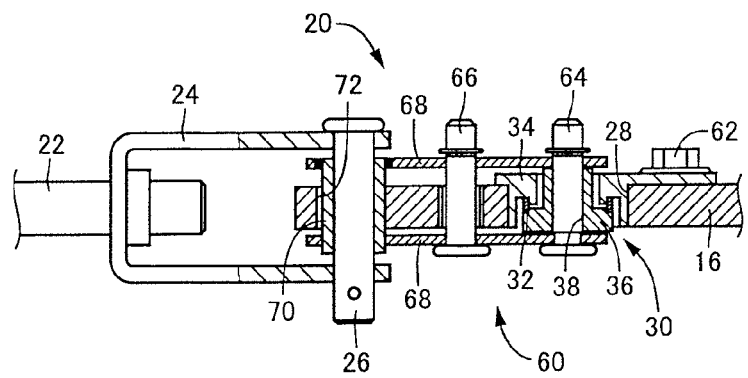
FIG. 1B is an enlarged cross-sectional view along line IA-IA of FIG. 1A.

FIG. 1 is a set of views showing a vehicular operating pedal device 10 for a service brake, which is an embodiment of the present invention, of which FIG. 1A is a front view thereof, and FIG. 1B is an enlarged cross-sectional view along line IA-IA of FIG. 1A. This vehicular operating pedal device 10 is constructed by applying the present invention to the above-mentioned operating pedal device 200 of FIG. 25, and includes an orientation converting mechanism 60 disposed between a load sensor 30 and a clevis pin 26 disposed on the operating pedal 16. In the operating pedal 16, a sensor attaching hole 28 is formed to be spaced by a predetermined distance from the clevis pin 26 toward a pad 18. The load sensor 30 is integrally fixed to the operating pedal 16 by use of an annular member 34 inserted into sensor attaching hole 28 and a fixing bolt 62, to thereby assume a predetermined posture (phase).

A sensor pin 64 is passing through a through-hole 38 of a shaft-like member 36 disposed in a hole of the annular member 34, has both axial ends that are projected laterally from the annular member 34 and the operating pedal 16, respectively, and that are connected to the clevis pin 26 via the orientation converting mechanism 60. In this embodiment, the sensor pin 64 is provided as an element constructionally independent of the shaft-like member 36, and is inserted into the through-hole 38 relatively rotatable thereto. However, the sensor pin 64 may be formed integrally with the shaft-like member 36. A wire harness 56 having its end provided with a connector 58, is connected to a control circuit unit of a vehicle via the connector 58. The annular member 34 corresponds to a claimed main body member, and the clevis pin 26 corresponds to a claimed connecting pin of the pivotal movement connecting portion 20.

The orientation converting mechanism 60 mechanically changes a direction of the reaction force applied from the clevis pin 26 so that the load can act from a predetermined direction around the center line O of the load sensor 30. The orientation converting mechanism 60 includes a pair of pivotal moving links 68 disposed on the operating pedal 16 pivotably around a supporting pin 66 parallel to the clevis pin 26. The supporting pin 66 is disposed on the operating pedal 16 via a bearing to be relatively pivoted around the axis thereof, and has both axial ends projected laterally from the operating pedal 16.

The pair of pivotal moving links 68 both having the same shape and being symmetrically disposed on both sides of the operating pedal 16, are pivotably disposed at both axial ends of the supporting pin 66, respectively. The pair of pivotal moving links 68 are supported by the supporting pin 66 at their longitudinally intermediate positions. One longitudinal end of each of the pivotal moving links 68 is connected to the clevis pin 26 to be pivoted relative thereto, whereas other longitudinal end is connected to the sensor pin 64 to be pivoted relative thereto. The pair of pivotal moving links 68 are integrally fixed to a bush 70 disposed around the clevis pin 26, and are connected mutually via the bush 70.

In a plan view seen from the axial direction of the supporting pin 66, i.e., in the state of FIG. 1A, a connected position between the pivotal moving link 68 and the clevis pin 26 is set so that a line segment connecting these two elements intersects at substantially right angle with the center line of the operating rod 22 serving as the claimed reaction force member. The reason is that the reaction force is acted from a direction substantially perpendicular to the line segment connecting the supporting pin 66 and the clevis pin 26. The clevis pin 26 is inserted into a clearance hole 72 formed in the operating pedal 16 together with the bush 70, and has both axial ends projected outwardly from the bush 70 to be connected to the clevis 24 to be pivotable relative thereto. The reason is that the pivotal movement of the pivotal moving link 68 necessary to detect the operating force is allowed based on the deformation of the deforming member 32 of the load sensor 30. Here, the clearance hole 72 is formed in a circular arc shape centering on the supporting pin 66 or in a linear shape, but a notch extending to an end of the operating pedal 16 may be provided as an example instead of the clearance hole 72.

With this structure, the reaction force is transmitted from the clevis pin 26 to the sensor pin 64 through the pivotal moving link 68. Even if the operating rod 22 and the operating pedal 16 are relatively pivoted around the axis of the clevis pin 26 in accordance with the depressing operation of the operating pedal 16, the load always acts from the predetermined direction on the shaft-like member 36 of the load sensor 30, maintaining a deformed part of the deforming member 32 substantially constant, that is the deforming member 32 deforms at the constant i.e., fixed part. The "predetermined direction" denotes a direction substantially perpendicular to a line segment connecting the sensor pin 64 and the supporting pin 66 in a plan view seen from the axial direction of the sensor pin 64 (i.e., in the state of FIG. 1A).

Figure 2A:
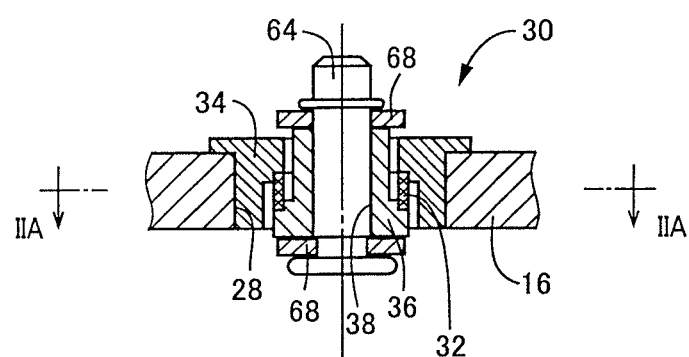
FIG. 2A is a longitudinal sectional view parallel to the center line O.
Figure 2B:
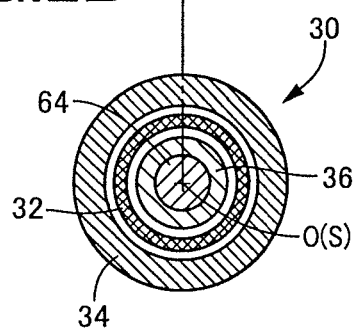
FIG. 2B is a cross-sectional view along line IIA-IIA of FIG. 2A.
Figure 3A:
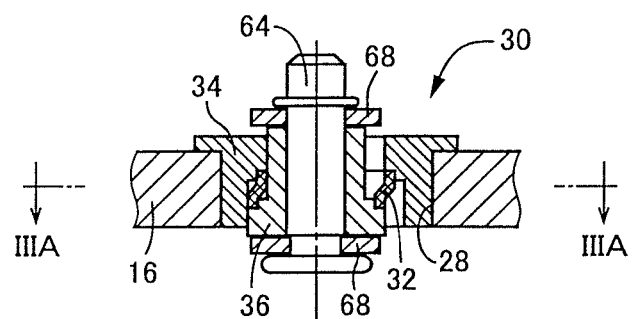
FIG. 3A is a longitudinal sectional view parallel to the center line O.
Figure 3B:
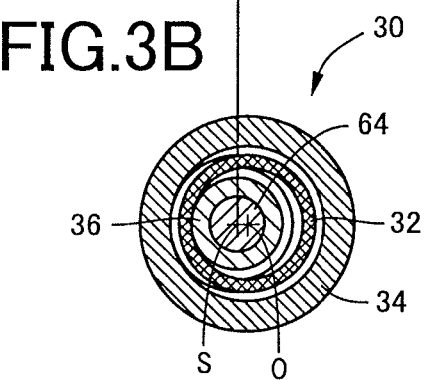
FIG. 3B is a cross-sectional view along line IIIA-IIIA of FIG. 3A.

FIG. 2A is a sectional view of the load sensor 30 in a direction perpendicular to the line segment connecting the sensor pin 64 and the supporting pin 66 in the plan view (i.e., in the state of FIG. 1A), and FIG. 2B is a cross-sectional view along line IIA-IIA of FIG. 2A. In FIG. 2, the sensor pin 64 is pivotable relative to both the shaft-like member 36 and the pivotal moving link 68. When the deforming member 32 deforms as shown in FIG. 3 by depressing the operating pedal 16, a member having less friction, e.g., the pivotal moving link 68 is relatively pivoted, though the pivotal movement angle is extremely small. To reduce friction, a bearing or the like can be provided if necessary. FIG. 3A and FIG. 3B correspond to FIG. 2A and FIG. 2B, respectively, and FIG. 3B is a cross-sectional view along line IIIA-IIIA of FIG. 3A.

The annular member 34 and the shaft-like member 36 are connected mutually via the deforming member 32 in this way. When the load externally applied in the radial direction, i.e., in a direction perpendicular to the center line O is approximately zero, the axis S of the shaft-like member 36 or that of the sensor pin 64 is kept in a state of substantially coinciding with the center line O of the load sensor 30 as shown in FIG. 2. The deforming member 32 is also kept in a cylindrical shape centering on the center line O over the entire length thereof. The center line O of the load sensor 30 is the center line of the annular member 34 integrally fixed to the operating pedal 16.

On the other hand, when the reaction force of the operating rod 22 acts on the sensor pin 64 via the orientation converting mechanism 60 in accordance with the depressing operation of the operating pedal 16, a load in the radial direction, more specifically, the load which relatively moves the shaft-like member 36 leftward in FIG. 2 (substantially leftward also in FIG. 1A) is acted between the annular member 34 and the shaft-like member 36. As a result, the deforming member 32 disposed therebetween undergoes shear deformation as shown in FIG. 3. An annular space is provided between the annular member 34 and the shaft-like member 36 to allow the relative movement therebetween in the radial direction, or a shear deformation of the deforming member 32.

The deforming member 32 is made of a metallic material such as ferritic stainless steel to be elastically deformed by receiving the load in the radial direction, and it can undergo shear strain according to an operating force generated by the depressing operation of the operating pedal 16. Actual deforming amount the deforming member 32 is extremely small, not influencing on a depressing stroke of the operating pedal. However, for an easy understanding, the amount of deformation thereof is exaggerated in the drawing. The same applies to the other similar drawings.

Figure 4A:
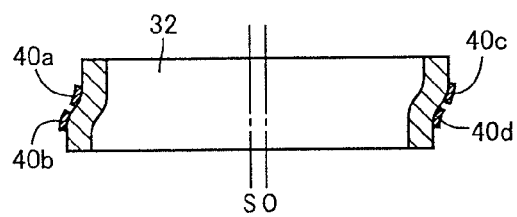
FIG. 4A is an enlarged cross-sectional view of the deforming member of FIG. 3A.
Figure 4B:
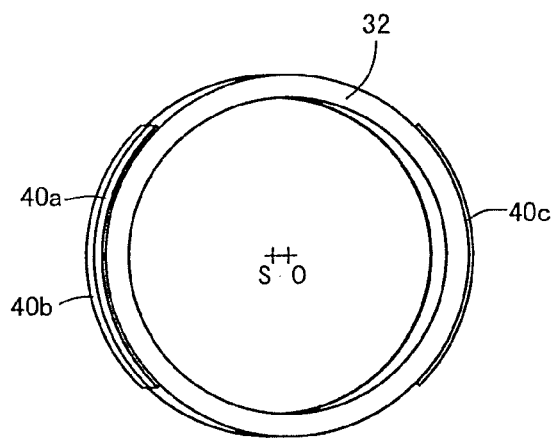
FIG. 4B is a plan view seen from above in FIG. 4A.
Figure 4C:
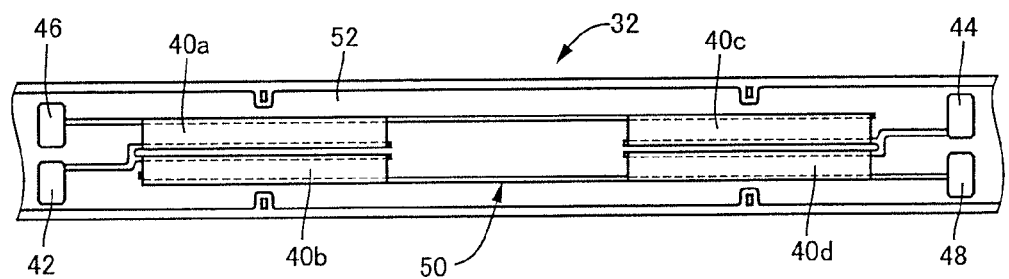
FIG. 4C is a development view of the deforming member, explaining a strain resistive element disposed on an outer circumferential surface thereof.

For detecting the shear strain of the deforming member 32, as shown in FIG. 4, four strain resistive elements 40a to 40d are attached on the outer peripheral surface of the deformation member 32 as the claimed strain detecting elements. Advantageous examples of the strain resistive elements 40a to 40d can be provided by thin-film and thick-film type semiconductor strain gages, a normal strain gage and the like. FIG. 4A is a cross-sectional view corresponding to FIG. 3, and shows the state where the deforming member 32 is shear-deformed. FIG. 4B is a plan view of the deforming member 32 as viewed from the top side in FIG. 4A. FIG. 4C is a developed view of the outer peripheral surface of the deforming member 32. The four strain resistive elements 40a to 40d are arranged at two locations that are symmetric with respect to the center line O (S), in a direction in which the deforming member 32 will be subjected to the shear strain by the external load. Two of the strain resistive elements are arranged at each of the two locations to be spaced away from each other in the axial direction. At each of the two locations, the two strain resistive elements are arranged at parts that will be deformed to be stretched or compressed by the shear strain.

In this embodiment, the acting direction of the load applied to the load sensor 30 by the orientation converting mechanism 60 is maintained substantially constant. That is, the acting direction of the load is maintained constant in the right-and-left direction in FIGS. 1A, 2A, 2B, 3A, 3B, 4A and 4B. For this reason, the strain resistive elements 40a to 40d are not required to be particularly large. However, in view of the assembling working of the deforming member 32 and the like, each of the strain resistive elements 40a to 40d has length that covers an angle range of approximately 90° in the circumferential direction of the deforming member 32.

Figure 5:
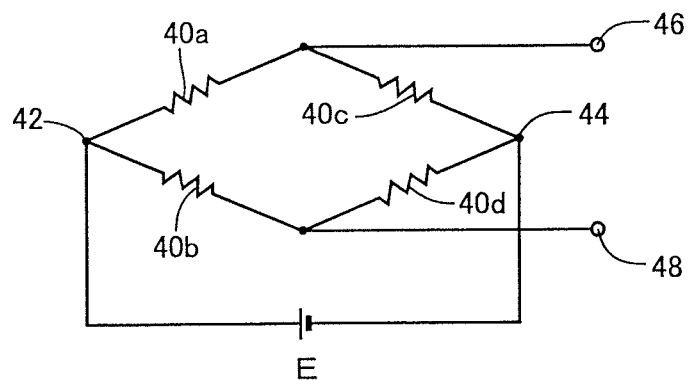
FIG. 5 is a circuit diagram showing a bridge circuit formed by connecting the strain resistive element shown in FIG. 4C by an electro-conductive circuit pattern.

The strain resistive elements 40a to 40d are connected by a conductive circuit pattern 50 (see FIG. 4C) to form a bridge circuit shown in FIG. 5. A power supply E is connected between a power supply terminal 42 of the conductive circuit pattern 50, and the GND (grounding) terminal 44 to provide an electrical signal in accordance with the strain between a pair of output terminals 46 and 48. For connecting the power supply E to the power supply terminal 42 or for taking out the electrical signal provided from the output terminals 46 and 48, a wire harness 56 (see to FIG. 1) connected to the terminals extends from the load sensor 30 to be connected to a vehicle control circuit portion via a connector 58.

An insulating film 52 (see. FIG. 4C) such as glass paste is previously formed on the outer peripheral surface of the deforming member 32, on which the conductive circuit pattern 50 made of a conductive material such as silver is formed. The strain resistive elements 40a to 40d are integrally formed by firing or burning or the like to be in partial contact with the conductive circuit pattern 50. Note that a control circuit portion may be disposed inside the load sensor 30. Different from the full bridge circuit used in this embodiment, a half bridge circuit can be used, for example, when using deforming member which has a partial arc shape only in a part receiving the load of the operation force of the operation pedal 16.

In the thus structured vehicular operating pedal device 10, the load sensor 30 electrically detecting the operating force based on the relative displacement between the annular member 34 and the shaft-like member 36 is disposed at the pivotal movement connecting portion 20 connecting the operating pedal 16 and the operating rod 22 to be relatively pivotable. The load sensor 30 detects the operating force transmitted through the clevis pin 26. Disposing the load sensor 30 within the sensor attaching hole 28 formed in the operating pedal 16 can make the whole operating pedal device 10 simple and compact, and does not influence on the installing conditions of conventional pedal devices. Additionally, using the relating members such as the operating rod 22, the clevis 24 and the clevis pin 26 which are the same as that in the conventional art, can achieve to production of the pedal device according to this embodiment at low cost.

On the other hand, the clevis pin 26 is inserted into the clearance hole 72, can displace relative to the operating pedal 16 in the longitudinal direction thereof. The orientation converting mechanism 60 is disposed between the clevis pin 26 and the sensor pin 64 of the load sensor 30. Accordingly, even if the operating pedal 16 and the operating rod 22 are relatively pivoted around the axis of the clevis pin 26 in accordance with the depressing operation of the operating pedal 16, the reaction force is always applied from the clevis pin 26 to the load sensor 30 in the substantially constant direction (i.e., substantially leftwardly in FIG. 1A). Owing to the constantly maintained deformed part of the deforming member 32, the detecting accuracy of the operating force is heightened, and variation in detecting accuracy is prevented, thus the high reliability being obtained.

In this embodiment, the pivotal moving link 68 serving the orientation converting mechanism 60 is sufficiently disposed around the axis of the supporting pin 66 to be pivotable. The sensor pin 64 of the load sensor 30 and the clevis pin 26 are sufficiently connected to both longitudinal ends of the pivotal moving link 68 to be relatively pivotable. Therefore, the device can be simply structured at low cost. Additionally, the device can be constructed compact in the forward and backward direction of the vehicle, which is a direction corresponding to the depressing direction of the operating pedal 16, or a pushing direction of the operating rod 22. By properly setting a lever ratio of the pivotal moving link 68, i.e., a ratio between length from the supporting pin 66 to the sensor pin 64 and length from the supporting pin 66 to the clevis pin 26, the operating force (reaction force) amplified or attenuated by the pivotal moving link 68 can be detected.

In this embodiment, the operating pedal 16 connected pivotably around the axis of the clevis pin 26 relative to the operating rod 22, is provided as the claimed sensor arranging member to dispose the load sensor 30 therein. Therefore, by detecting the final operating force (output) transmitted from the clevis pin 26 to the operating rod 22 by the load sensor 30, a braking force generated according to the output of the operating rod 22 can be detected with high accuracy.

The annular member 34 is fixed integrally in the sensor attaching hole 28 formed in the operating pedal 16. Additionally, one and other of the paired pivotal moving links 68 is respectively spanned between one and other of the both axial ends of the sensor pin 64 disposed on the axis S of the shaft-like member 36 and projecting from both sides of the sensor attaching hole 28, and one and other of the both axial ends of the clevis pin 26 inserted into the clearance hole 72 and projecting from both sides of the operating pedal 16. Therefore, the vehicular operating pedal device 10 can be constructed simple and compact. Additionally, owing to the substantially evenly applied load (reaction force) from the clevis pin 26 to the shaft-like member 36 of the load sensor 30, and the pivotal movement such as twist is prevented from acting on the load sensor 30, thus further heightening the detecting accuracy by the load sensor 30.

Next, other embodiments of the present invention will be described. In the following embodiments, the same reference numerals are given to elements substantially common in the embodiment, and a detailed descriptions thereof are omitted.

Figure 6:
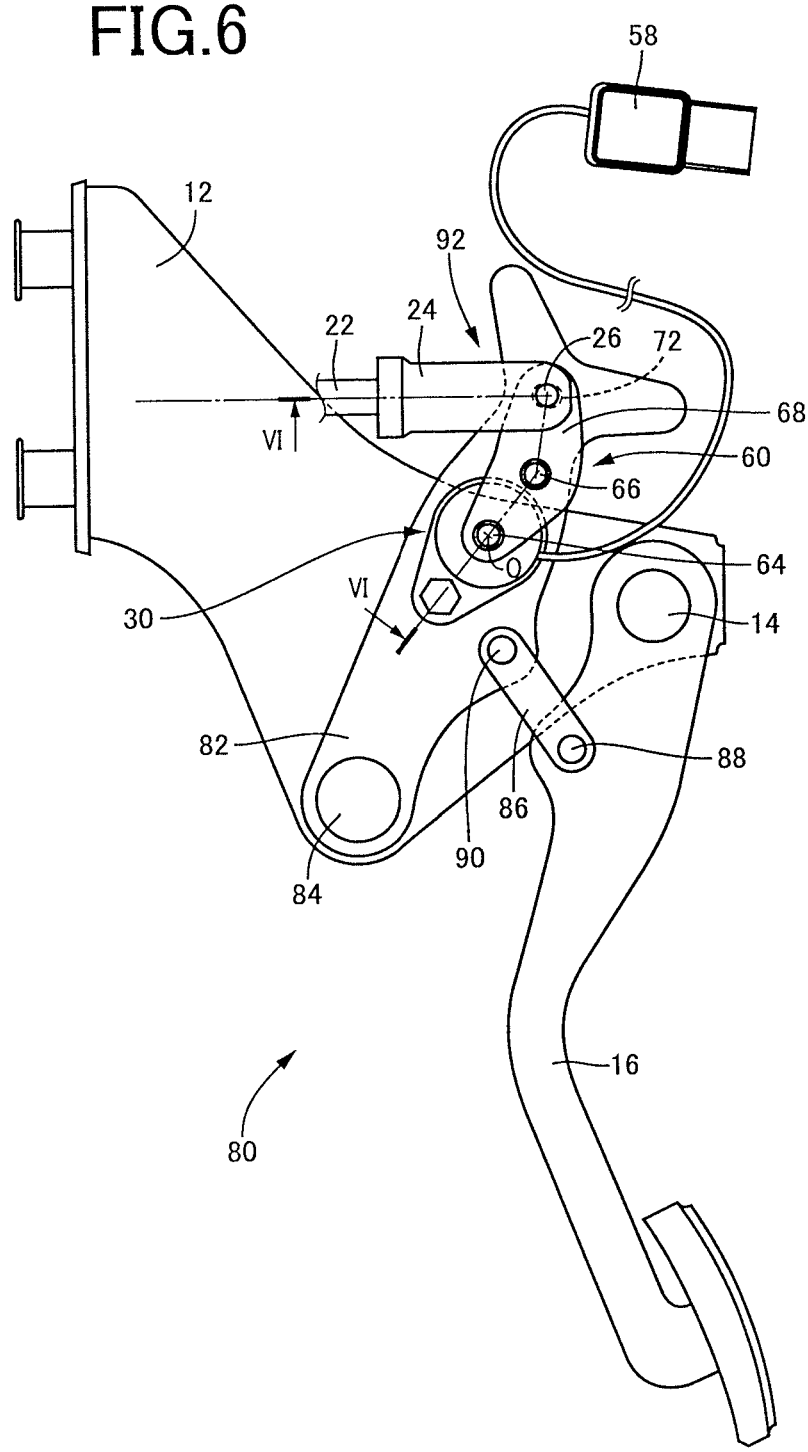
FIG. 6, corresponding to FIG. 1A, is a front view, showing another embodiment in which the present invention is applied to a vehicular operating pedal device including an intermediate lever and a load sensor and an orientation converting mechanism shown in FIGS. 1A and 1B are disposed at a pivotal movement connecting portion between the intermediate lever and the operating rod.

FIG. 6 shows an embodiment in which a vehicular operating pedal device 80 includes an intermediate lever 82 transmitting an operating force from the operating pedal 16 to the operating rod 22. The intermediate lever 82 is pivotably disposed on the pedal support 12 by a supporting pin 84 parallel to the support shaft 14, and is connected to the operating pedal 16 through a connecting link 86. Therefore, the intermediate lever 82 is mechanically pivoted around the supporting pin 84 in accordance with the depressing operation of the operating pedal 16. The connecting link 86 has both longitudinal ends respectively connected to the operating pedal 16 and to the intermediate lever 82 through a pair of linking pins 88 and 90 both parallel to the support shaft 14, to be pivotable relative thereto.

The operating rod 22 is connected to one longitudinal end i.e., top end of the intermediate lever 82 through a pivotal movement connecting portion 92. This pivotal movement connecting portion 92 has the same structure as the pivotal movement connecting portion 20. In more detail, the load sensor 30 is disposed in the sensor attaching hole formed in the intermediate lever 82, and the sensor pin 64 of the load sensor 30 is connected to the clevis pin 26 through the orientation converting mechanism 60. The clevis pin 26 corresponds to a claimed connecting pin of the pivotal movement connecting portion 92.

Therefore, this embodiment can render the same operation and effect as that in the above-mentioned embodiment. The cross-section along line VI-VI of FIG. 6 has a structure in which the operating pedal 16 in FIG. 1B is replaced with the intermediate lever 82 corresponding to a sensor arranging member.

Figure 7A:
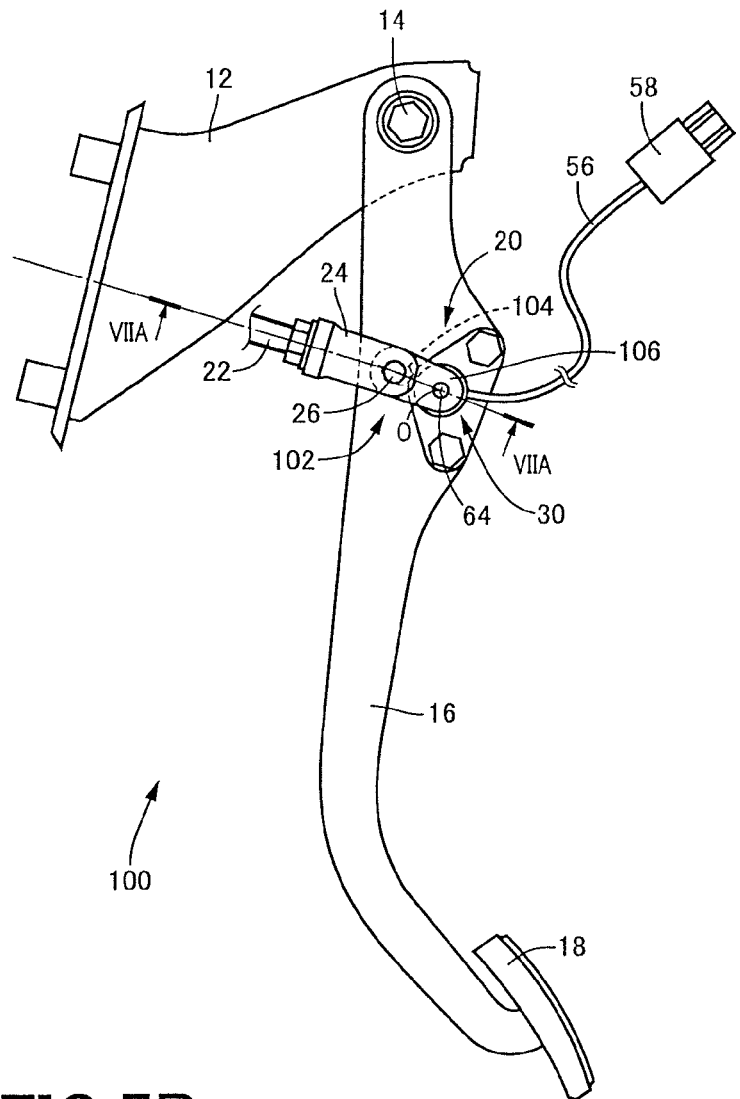
FIG. 7A is a front view corresponding to FIG. 1A.
Figure 7B:
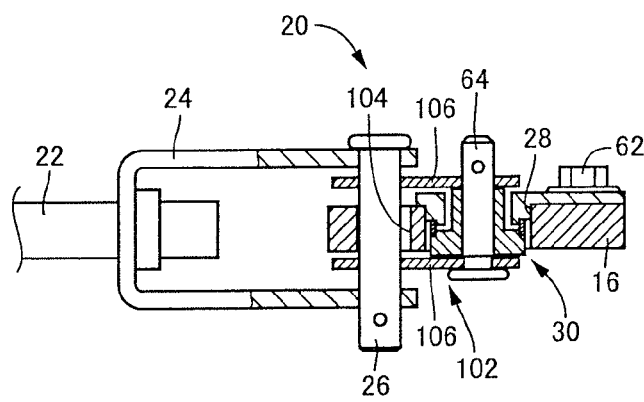
FIG. 7B is an enlarged cross-sectional view along line VIIA-VIIA of FIG. 7A.

A vehicular operating pedal device 100 shown in FIG. 7 differs in an orientation converting mechanism 102 from the vehicular operating pedal device 10 shown in FIG. 1. FIG. 7A and FIG. 7B correspond to FIG. 1A and FIG. 1B, respectively. FIG. 7A is a front view, and FIG. 7B is an enlarged cross-sectional view along line VIIA-VIIA of FIG. 7A. An orientation converting mechanism 102 includes a connecting pin guide 104 disposed on the operating pedal 16 to regulate a movement path for the clevis pin 26, and a linearly moving link 106 which connects the clevis pin 26 and the sensor pin 64 of the load sensor 30. The orientation converting mechanism 102 displaces the sensor pin 64 in a predetermined direction in accordance with the movement of the clevis pin 26.

The clevis pin 26 is inserted into the connecting pin guide 104 which is an elongated hole linearly formed in a direction perpendicular to the center line O (i.e., constant direction) of the load sensor 30, and is moved in a predetermined direction with guided by the connecting pin guide 104. A pair of linearly moving links 106, corresponds to a claimed interlocking member, are provided symmetrically with respect to the operating pedal 16 intervened therebetween. The linearly moving link 106 has one longitudinal end connected to the clevis pin 26 to be pivotable relative thereto, and other longitudinal end connected to the sensor pin 64 to be pivotable relative thereto.

In the vehicular operating pedal device 100 structured in this way, the clevis pin 26 is linearly moved in a predetermined direction perpendicular to the center line O of the load sensor 30 with guided by the connecting pin guide 104. Likewise, the sensor pin 64 connected to the clevis pin 26 through the linearly moving link 106 is moved linearly in the predetermined direction. Therefore, even if the operating pedal 16 and the operating rod 22 are pivoted around the axis of the clevis pin 26 relative to each other in accordance with the depressing operation of the operating pedal 16, a reaction force from the clevis pin 26 is always applied to the load sensor 30 through the linearly moving link 106 in a constant i.e., fixed direction. As a result, owing to the constantly maintained deformed part of the deforming member 32, the detecting accuracy of the operating force is heightened, and variation in detecting accuracy is prevented, thus the high reliability being rendered.

In the present invention, all that is required is to provide the connecting pin guide 104 which moves the clevis pin 26 in a predetermined direction and which connects the clevis pin 26 and the sensor pin 64 by the linearly moving link 106. Therefore, the device can be simply structured at low cost and can be structured compact.

Additionally, disposing the load sensor 30 in the sensor attaching hole 28 of the operating pedal 16 can makes the vehicular operating pedal device 100 compact. Thus, the vehicular operating pedal device 100 can render the same operation and effect as the vehicular operating pedal device 10 mentioned above.

Figure 8:
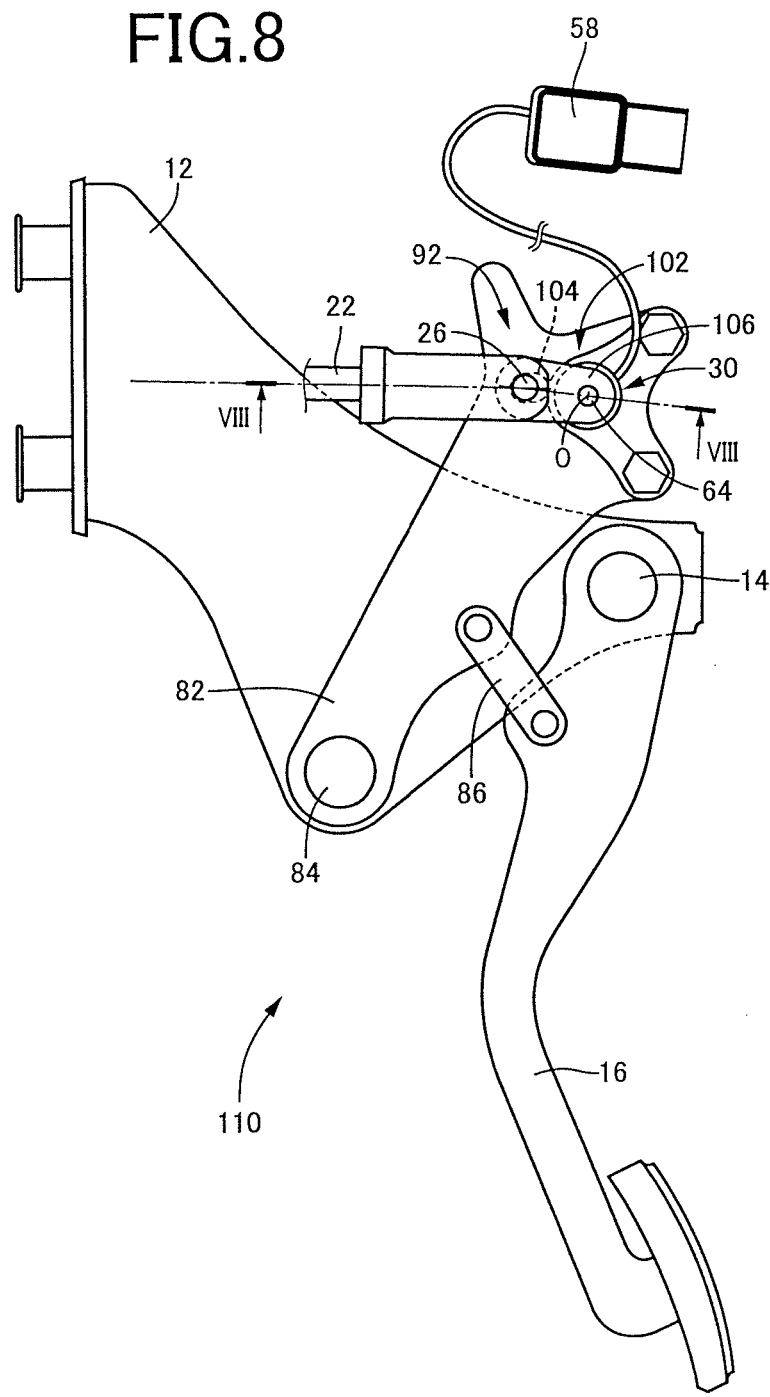
FIG. 8, corresponding to FIG. 7A, is a front view showing still another embodiment in which the present invention is applied to a vehicular operating pedal device including an intermediate lever, and the load sensor and the orientation converting mechanism shown in FIG. 7 are disposed at the pivotal movement connecting portion between the intermediate lever and the operating rod.

A vehicular operating pedal device 110 shown in FIG. 8 includes the intermediate lever 82 similar to the vehicular operating pedal device 80 shown in FIG. 6. The load sensor 30 is disposed at a pivotal movement connecting portion 92 serving as the connecting portion between the intermediate lever 82 and the operating rod 22. The load sensor 30 is disposed in a sensor attaching hole formed in the intermediate lever 82, and its sensor pin 64 is connected to the clevis pin 26 through the orientation converting mechanism 102 of FIG. 7A. Therefore, also in this embodiment, the same operation and effect as that in the vehicular operating pedal device 100 of FIG. 7A can be rendered as well. The cross-section along line VIII-VIII of FIG. 8 has a structure in which the operating pedal 16 in FIG. 7B is replaced with the intermediate lever 82.

Figure 9A:
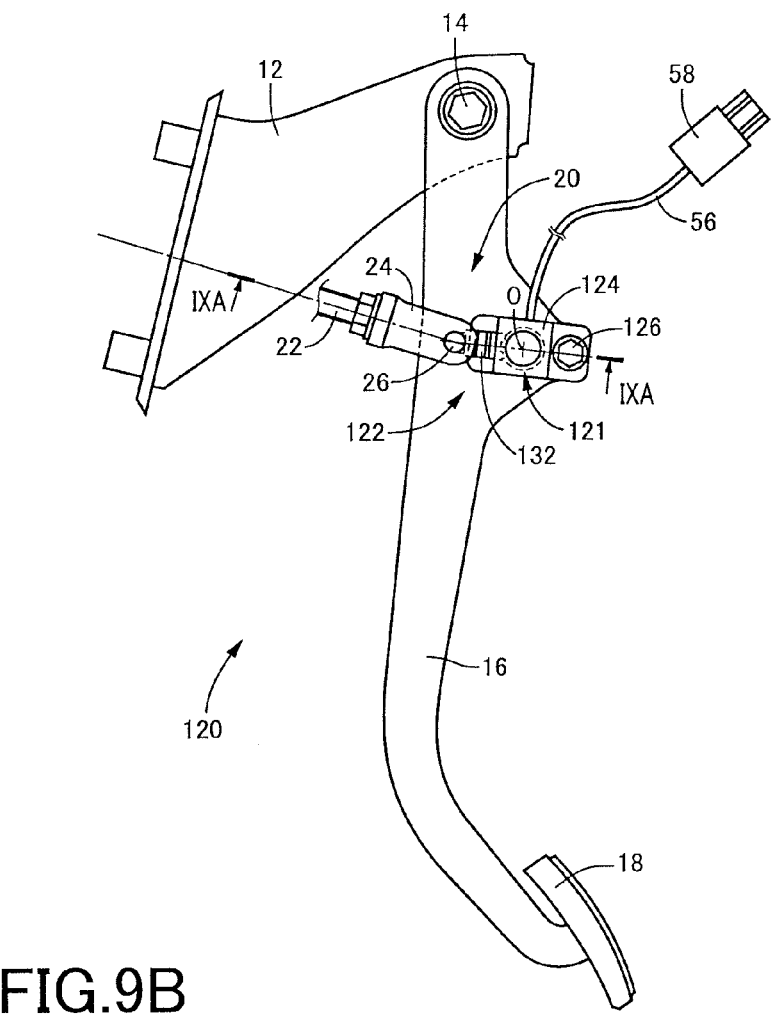
FIG. 9A is a front view corresponding to FIG. 1A.
Figure 9B:
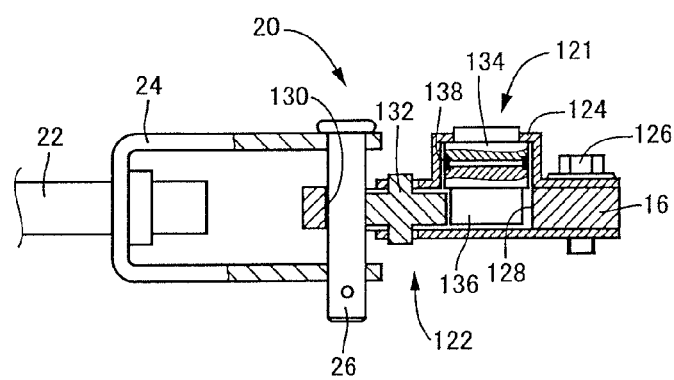
FIG. 9B is an enlarged cross-sectional view along line IXA-IXA of FIG. 9A.

A vehicular operating pedal device 120 shown in FIG. 9 differs from the vehicular operating pedal device 100 shown in FIG. 7 in structure and arrangement of the load sensor 121, and in an orientation converting mechanism 122. FIG. 9A and FIG. 9B correspond to FIG. 7A and FIG. 7B, respectively. FIG. 9A is a front view, and FIG. 9B is an enlarged cross-sectional view along line IXA-IXA of FIG. 9A. In the load sensor 121, a stepped cylindrical main body member 134 is integrally fixed to a case 124, and a shaft-like member 136 is disposed concentrically with the main body member 134 via the cylindrical deforming member 138. The load sensor 121 is integrally fixed to the operating pedal 16 by a fixing bolt 126 through the case 124. The shaft-like member 136 projecting into a housing hole 128 formed in the operating pedal 16, is allowed to displace relative to the main body member 134 by the shear deformation of the deforming member 138 in a direction perpendicular to the axis. The deforming member 138, formed likewise the deforming member 32 mentioned above, has an outer circumferential surface to which the strain resistive elements 40a to 40d are attached.

The orientation converting mechanism 122 includes a connecting pin guide 130 disposed on the operating pedal 16 to regulate a movement path for the clevis pin 26, and a sliding member 132 disposed between the clevis pin 26 and the shaft-like member 136. The orientation converting mechanism 122 displaces the shaft-like member 136 in a constant direction in accordance with the movement of the clevis pin 26. The clevis pin 26 is inserted into the connecting pin guide 130 which is an elongated hole linearly formed in a direction perpendicular to the center line O (i.e., constant direction) of the load sensor 121, and is moved in a constant direction with guided by the connecting pin guide 130. A sliding member 132 corresponds to a claimed connection member. Between the connecting pin guide 130 and the housing hole 128, a linear guide groove is formed, which connects them and which guide the sliding member 132 in the constant direction likewise. The sliding member 132 is disposed in the guide groove with intervening or interposing between the clevis pin 26 and the shaft-like member 136.

Also, in the vehicular operating pedal device 120, the clevis pin 26 linearly moves in a constant direction perpendicular to the center line O of the load sensor 121 with guided by the connecting pin guide 130. The shaft-like member 136 also moves in this constant direction via the sliding member 132. Therefore, even if the operating pedal 16 and the operating rod 22 are relatively pivoted around the axis of the clevis pin 26 in accordance with the depressing operation of the operating pedal 16, the reaction force applied from the clevis pin 26 to the load sensor 121 through the sliding member 132 is maintained in the constant direction. As a result, the constantly maintained deformed part of the deforming member 138 heighten the detecting accuracy of an operating force, and prevents the variation in detecting accuracy, thus rendering the high reliability.

In this embodiment, all that is required is to provide the connecting pin guide 130 which moves the clevis pin 26 in the constant direction and to dispose the sliding member 132 between the clevis pin 26 and the shaft-like member 136. Therefore, the device can be simply structured at low cost and can be structured compact. Thus, this embodiment can render the same operation and effect as the vehicular operating pedal device 100 of FIG. 7A.

Figure 10:
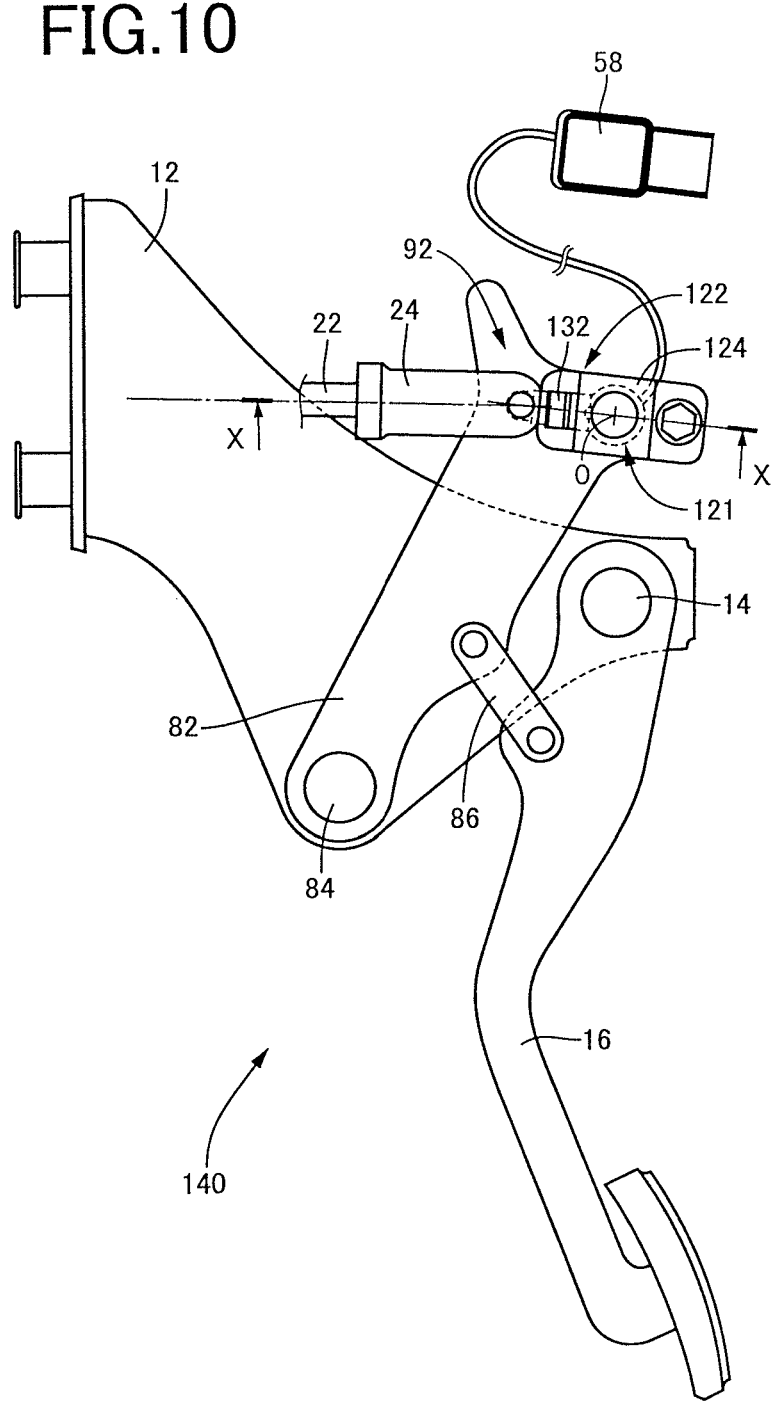
FIG. 10, corresponding to FIG. 9A, is a front view showing still another embodiment in which the present invention is applied to a vehicular operating pedal device including an intermediate lever, and the load sensor and the orientation converting mechanism shown in FIGS. 9A and 9B are disposed at a pivotal movement connecting portion between the intermediate lever and the operating rod.

A vehicular operating pedal device 140 shown in FIG. 10 includes the intermediate lever 82 similar to the vehicular operating pedal device 80 shown in FIG. 6. A load sensor 121 is disposed at the pivotal movement connecting portion 92 serving as the connecting portion between the intermediate lever 82 and the operating rod 22. The load sensor 121 is disposed on one side of the intermediate lever 82 by use of the case 124, and the reaction force of the clevis pin 26 is acted on the shaft-like member 136 of the load sensor 121 by the orientation converting mechanism 122 of FIG. 9A. Therefore, this embodiment can render the same operation and effect as that in the vehicular operating pedal device 120 of FIG. 9A.

The cross-section along line X-X of FIG. 10 has a structure in which the operating pedal 16 in FIG. 9B is replaced with the intermediate lever 82.

Figure 11A:
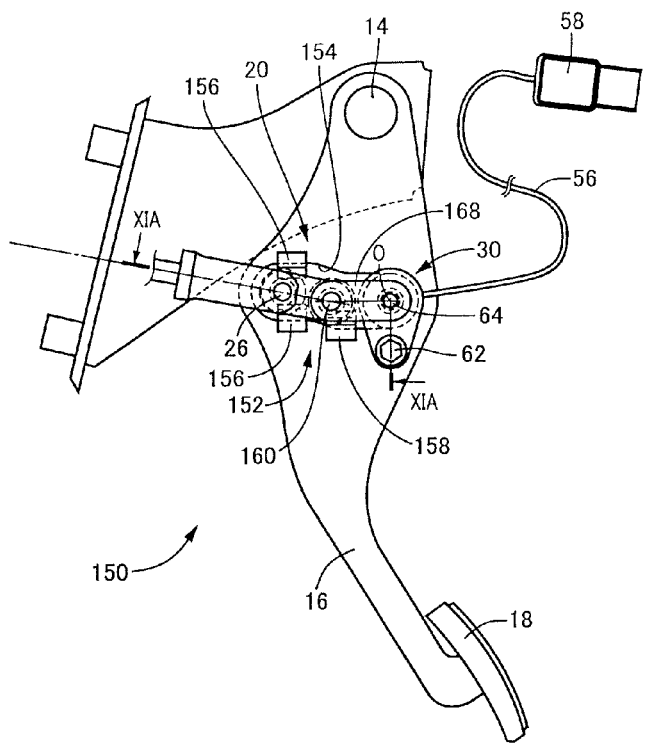
FIG. 11A is a front view corresponding to FIG. 1A.
Figure 11B:
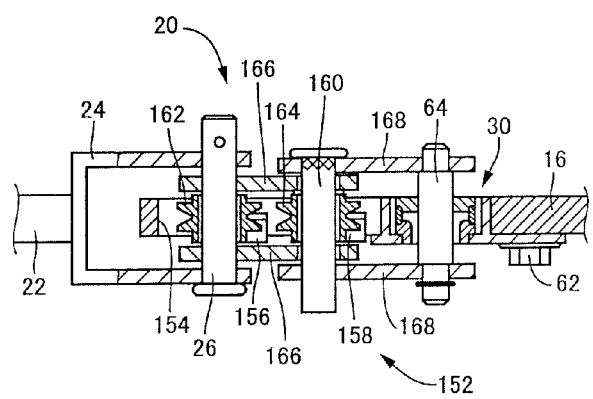
FIG. 11B is an enlarged cross-sectional view along line XIA-XIA of FIG. 11A.

A vehicular operating pedal device 150 shown in FIG. 11 differs in an orientation converting mechanism 152 from the vehicular operating pedal device 10 shown in FIG. 1. FIG. 11A and FIG. 11B correspond to FIG. 1A and FIG. 1B, respectively. FIG. 11A is a front view, and FIG. 11B is an enlarged cross-sectional view along line XIA-XIA of FIG. 11A. The operating pedal 16 serving as the claimed sensor arranging member has an elongated guide hole 154 contiguous to the sensor attaching hole 28. In the guide hole 154, a first guide member 156 and a second guide member 158 both constructing the orientation converting mechanism 152 are disposed, and the clevis pin 26 and the intermediate pin 160 are inserted in the first guide member 156 and the second guide member 158.

A pair of first guide member 156 serving as a connecting pin guide regulating a movement path of the clevis pin 26 are disposed at both axial sides of the clevis pin 26 in the direction perpendicular to the axis thereof. The first guide members 156 are engaged with a pulley 162 rotatably mounted on the clevis pin 26 to guide the clevis pin 26 in a linear direction corresponding to the substantially rightward and leftward direction in FIG. 11A.

A second guide member 158 serves as the claimed intermediate guide which linearly moves the intermediate pin 160 serving as the claimed intermediate sliding member in a direction perpendicular to the center line O (predetermined direction) of the load sensor 30. The second guide member 158 is engaged with a pulley 164 rotatably mounted on the intermediate pin 160. With this structure, the second guide member 158 guides the intermediate pin 160 in the linear direction corresponding to substantially rightward and leftward direction in FIG. 11A.

The clevis pin 26 and the intermediate pin 160 are connected relatively pivotable to the pair of interlocking links 166 symmetrically disposed on both sides of the operating pedal 16 with intervening it therebetween, so that the intermediate pin 160 displaces in a constant direction in accordance with the movement of the clevis pin 26. Additionally, the intermediate pin 160 and the sensor pin 64 are respectively connected to the pair of linearly moving links 168 symmetrically disposed on both sides of the operating pedal 16 with intervening it therebetween. Therefore, the intermediate pin 160 and the sensor pin 64 in turn displace in the constant direction in accordance with the movement of the clevis pin 26. In this embodiment, the intermediate pin 160, the interlocking link 166, and the linearly moving link 168 construct the interlocking members. The linearly moving link 168 is integrally fixed to the intermediate pin 160, and is pivotably connected relative to the sensor pin 64.

Also in this vehicular operating pedal device 150, by the movement in the linear direction of the clevis pin 26 guided by the first guide member 156, the sensor pin 64 displaces in the constant direction perpendicular to the center line O of the load sensor 30 by the interlocking link 166, the intermediate pin 160, and the linearly moving link 168. Therefore, even if the operating pedal 16 and the operating rod 22 are relatively pivoted around the axis of the clevis pin 26 in accordance with the depressing operation of the operating pedal 16, the reaction force applied from the clevis pin 26 to the load sensor 30 is always maintained in the constant direction. As a result, the constantly maintained deformed part of the deforming member can heighten the detecting accuracy of an operating force, and prevents variation in detecting accuracy, thus rendering the high reliability.

The movement path of the clevis pin 26 is regulated by the first guide member 156. The intermediate pin 160 moves in the predetermined direction by the second guide member 158, and the clevis pin 26 are connected by the interlocking link 166. The reaction force applied to the clevis 24 is transmitted from the intermediate pin 160 to the sensor pin 64 of the load sensor 30 through the linearly moving link 168. Therefore, the design freedom of the connecting position of the clevis pin 26 and the disposing position of the load sensor 30 can be increased.

In addition, disposing the load sensor 30 in the sensor attaching hole 28 of the operating pedal 16 can construct the vehicular operating pedal device 150 compact. The same operation and effect as the vehicular operating pedal device 10 can be obtained in the vehicular operating pedal device 150.

Figure 12:
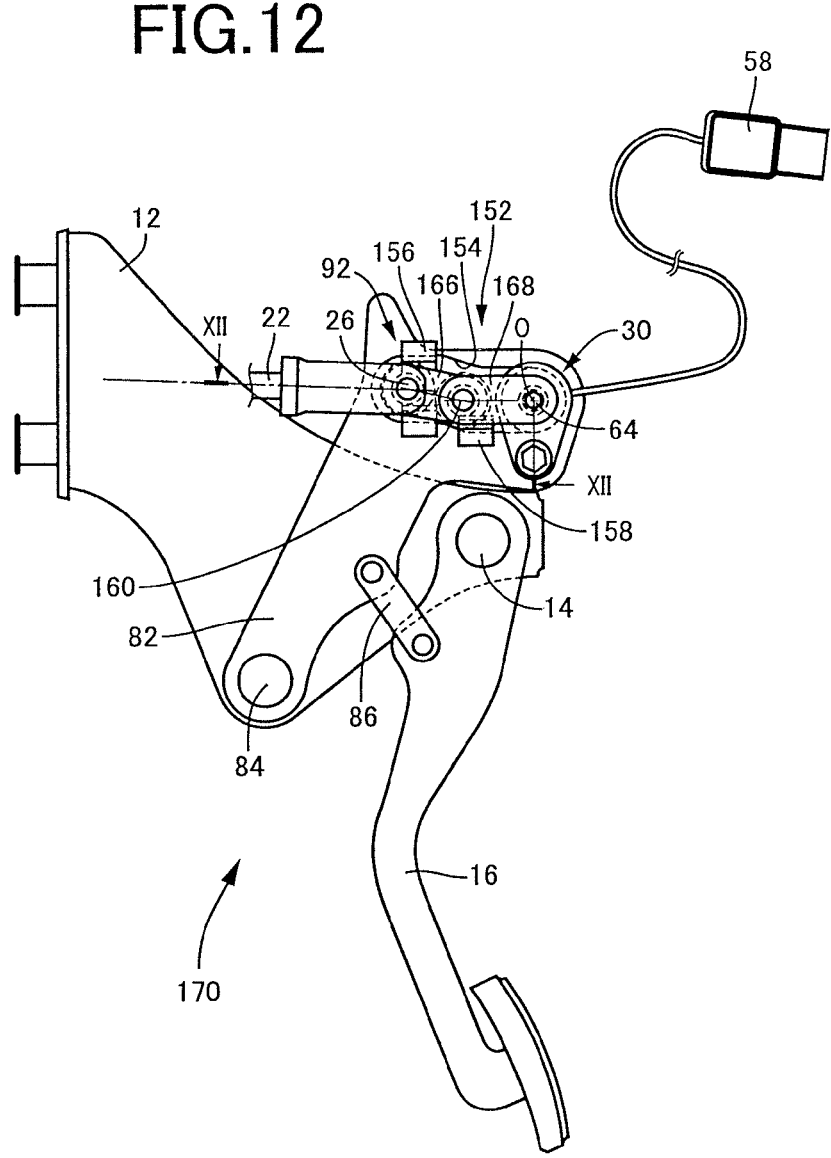
FIG. 12, corresponding to FIG. 11A, is a front view showing still another embodiment in which the present invention is applied to a vehicular operating pedal device including an intermediate lever, and the load sensor and the orientation converting mechanism shown in FIGS. 11A and 11B are disposed at a pivotal movement connecting portion between the intermediate lever and the operating rod.

FIG. 12 shows the vehicular operating pedal device 170 in which the intermediate lever 82 is provided in the same way as the vehicular operating pedal device 80 of FIG. 6. At the pivotal movement connecting portion 92 serving as the connecting portion between the intermediate lever 82 and the operating rod 22, the load sensor 30 is disposed. The intermediate lever 82 is provided with a guide hole 154, a first guide member 156, a second guide member 158, and the like. The orientation converting mechanism 152 of FIG. 11 is disposed on this intermediate lever 82. Thus, the vehicular operating pedal device 170 is constructed so that the reaction force from the clevis pin 26 is always applied to the load sensor 30 in the constant direction. Therefore, this embodiment can renders the same operation and effect as that in the vehicular operating pedal device 150 of FIG. 11A. The cross-section along line of XII-XII of FIG. 12 corresponds to the structure in which the operating pedal 16 in FIG. 11B is replaced with the intermediate lever 82.

A vehicular operating pedal device 180 shown in FIG. 13 differs in the disposing position of the load sensor 30 from the vehicular operating pedal device 80 shown in FIG. 6. In a pivotal movement connecting portion 182 which connects the connecting links 86 to the intermediate lever 82 through the linking pin 90, the load sensor 30 and the orientation converting mechanism 60 are disposed in the intermediate lever 82 to detect an operating force transmitted from the linking pin 90 to the intermediate lever 82. More specifically, the load sensor 30 is disposed in a sensor attaching hole 184 formed in the intermediate lever 82, and the sensor pin 64 of the load sensor 30 is connected to the linking pin 90 through the orientation converting mechanism 60.

Figure 13A:
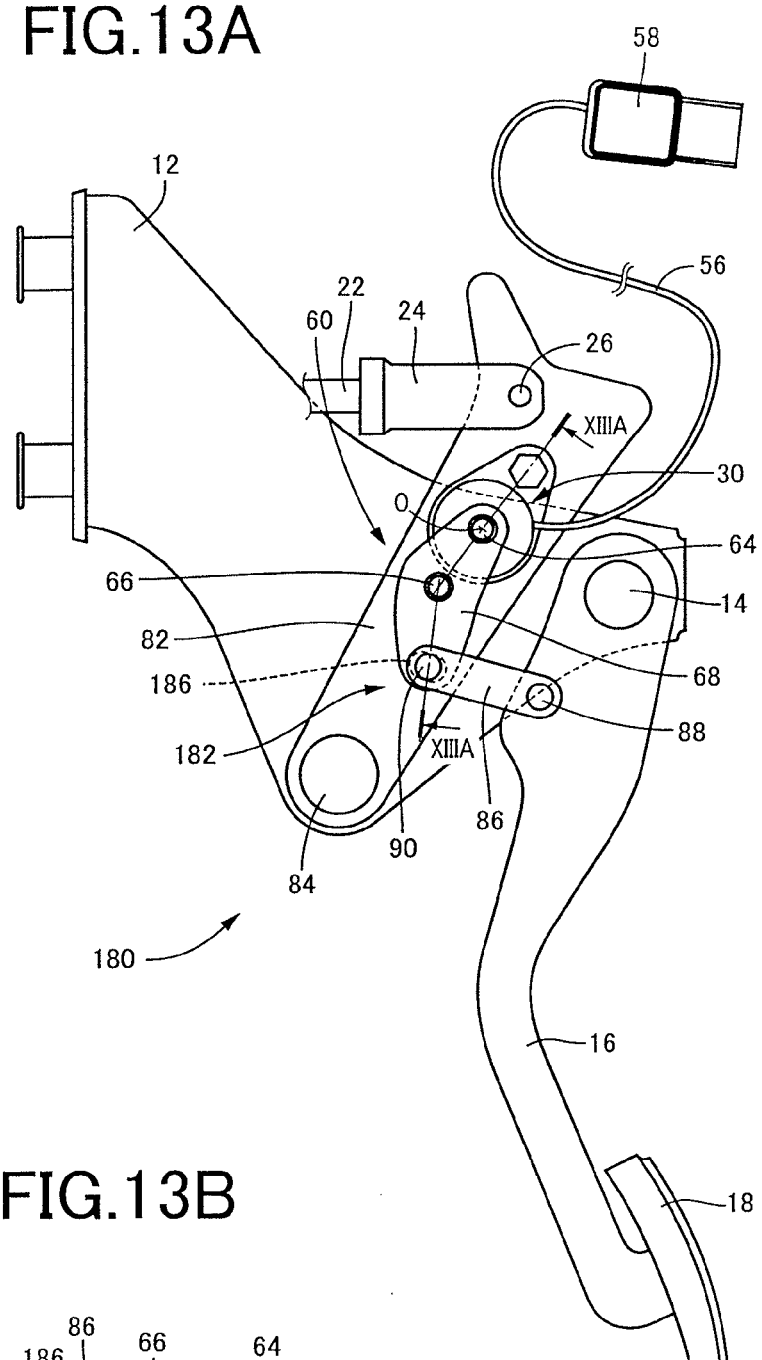
FIG. 13A is a front view corresponding to FIG. 1A.
Figure 13B:
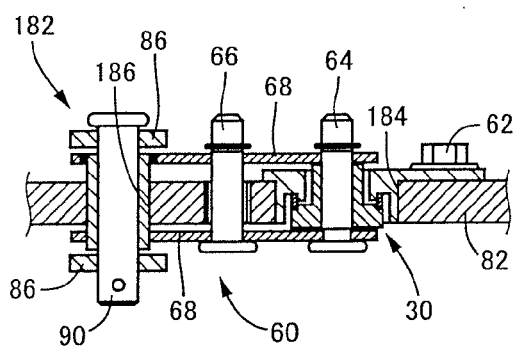
FIG. 13B is an enlarged cross-sectional view along line XIIIA-XIIIA of FIG. 13A.

The intermediate lever 82 has a clearance hole 186 allowing the linking pin 90 to pivot around the axis of the supporting pin 66, so that the operating force is always applied from the linking pin 90 to the load sensor 30 in the constant direction. The linking pin 90 corresponds to a claimed connecting pin of the pivotal movement connecting portion 182. Therefore, this embodiment can render, the same operation and effect as that in the embodiments shown in FIG. 1A, FIG. 1B, and FIG. 6. FIG. 13A and FIG. 13B correspond to FIG. 1A and FIG. 1B, respectively. FIG. 13A is a front view, and FIG. 13B is an enlarged cross-sectional view along line XIIIA-XIIIA of FIG. 13A.

The present invention can be applied to a pivotal movement connecting portion which connects the connecting link 86 to the operating pedal 16 through the linking pin 88 to be pivotable relative thereto, or to a pivotal movement connecting portion in which the intermediate lever 82 is pivotably attached to the pedal support 12 by the supporting pin 84. In these pivotal movement connecting portions, the load applied to the linking pin 88 or to the supporting pin 84 is detected as the operating force.

Figure 14A:
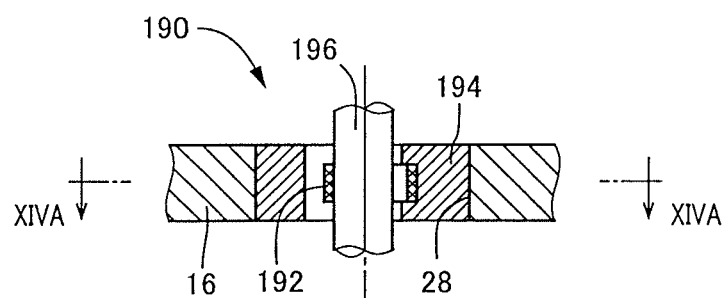
FIG. 14A is a longitudinal sectional view parallel to the center line O.
Figure 14B:
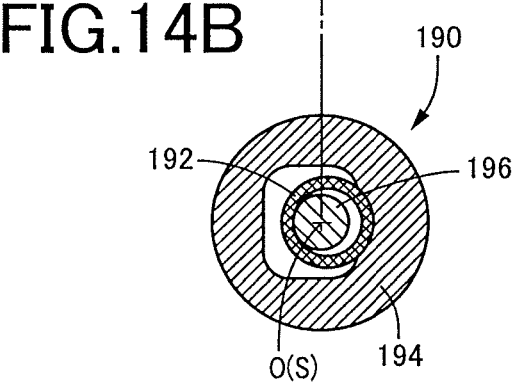
FIG. 14B is a cross-sectional view along line XIVA-XIVA of FIG. 14A.
Figure 15A:
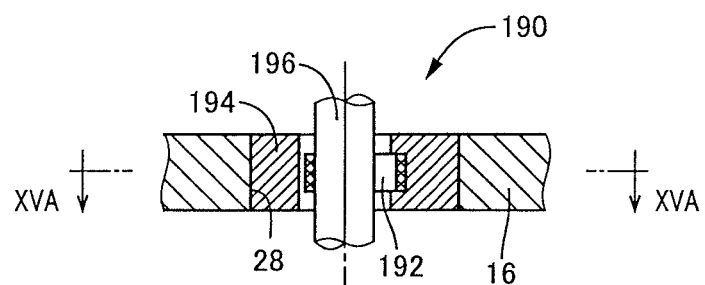
FIG. 15A is a longitudinal sectional view parallel to the center line O.
Figure 15B:
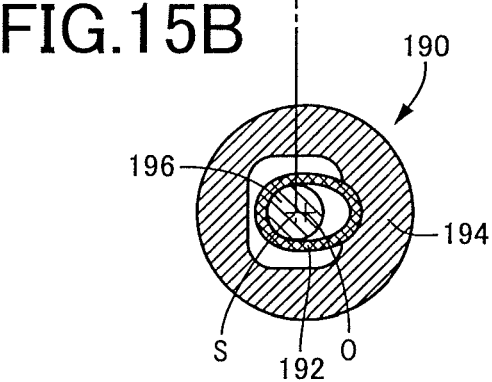
FIG. 15B is a cross-sectional view along line XVA-XVA of FIG. 15A.

FIG. 14 and FIG. 15 are views showing a load sensor 190 used instead of the load sensor 30 in the embodiment of FIG. 1. These are sectional views corresponding to FIG. 2 and FIG. 3, respectively. FIG. 14A and FIG. 15A are longitudinal sectional views parallel to the center line O, and FIG. 14B and FIG. 15B are cross-sectional views along line XIVA-XIVA of FIG. 14A and line XVA-XVA of FIG. 15A, respectively. The load sensor 190 includes a cylindrical deforming member 192 which detects the load applied thereto in the radial direction thereof. An annular member 194 is disposed on the outer peripheral side of the deforming member 192. The annular member 194 is integrally attached to the sensor attaching hole 28 with a predetermined posture (phase) by press fitting or by use of a bolt or a leaf spring, and it integrally holds a part of the deforming member 192 around the center line (i.e., a right sidewall part shown in FIG. 14 and FIG. 15) by welding, for example. A shaft-like member 196 is inserted into a cylindrical inner hole of the deforming member 192, to which the pivotal moving link 68 of the orientation converting mechanism 60 is connected. The sensor pin 64 can be used as the shaft-like member 196. The annular member 194 corresponds to a claimed main body member.

In the load sensor 190, when the value of the externally applied load is approximately zero, the annular member 194 is kept to be substantially concentric with the axis S of the shaft-like member 196 as shown in FIG. 14. The deforming member 192 is kept to be eccentric with respect to the axis S so that an inner circumferential surface of a sidewall part thereof on a side opposite to a side fixed to the annular member 194, that is, on the left side in FIG. 14 substantially comes into contact with the shaft-like member 196. This state is regulated by pressing the operating rod 22 rightward in FIG. 1A by the action of a return spring (not shown) for example, and by causing the operating pedal 16 to abut to a stopper (not shown) to be located in an initial position. In this state, the deforming member 192 has a cylindrical shape of a substantially true circle.

On the other hand, when the load is radially applied between the annular member 194 and the shaft-like member 196 by a reaction force of the operating rod 22 in accordance with the depressing operation of the operating pedal 16, the shaft-like member 196 displaces leftward relative to the annular member 194 in FIG. 14 and FIG. 15. As a result, the deforming member 192 is stretched and deformed into an oval as shown in FIG. 15. The annular member 194 has an annular internal space large enough to allow relative displacement with respect to the shaft-like member 196 or allow the tensile deformation of the deforming member 192. The deforming member 192 being made of a metallic material such as ferritic stainless steel, and capable of elastically deforming by receiving the radial load, undergoes tensile deformation according to the operating force generated by the depressing operation of the operating pedal 16.

To detect the tensile strain of the deforming member 192, strain resistive elements serving as the strain detecting element are fixed, on the outer circumferential surface of the deforming member 192, at an upper sidewall part and a lower sidewall part in FIG. 15B, i.e., to parts at which tensile strain is caused on the outer circumferential surface of the deforming member 192. Similar to the above embodiments, the insulation film such as the glass paste is disposed in advance on the outer circumferential surface of the deforming member 192, and the electro-conductive circuit pattern is formed on the insulation film by the conductive material such as silver.

The strain resistive elements are formed integrally by firing for example so that a part thereof can come into contact with the electro-conductive circuit pattern.

The size and the disposing position of the strain resistive element are appropriately set in consideration of assembly workability for example. In the present invention, the load always acts in the constant direction, regardless of the operating amount of the depressed operating pedal 16, so that the deforming member 192 deforms at the constant part. Therefore, high detecting accuracy can be stably obtained even when the strain resistive element is comparatively small.

Even in the other embodiments shown in the drawings subsequent to FIG. 6, the load sensor 190 can be used instead of the load sensor 30 as well.

Figure 16A:
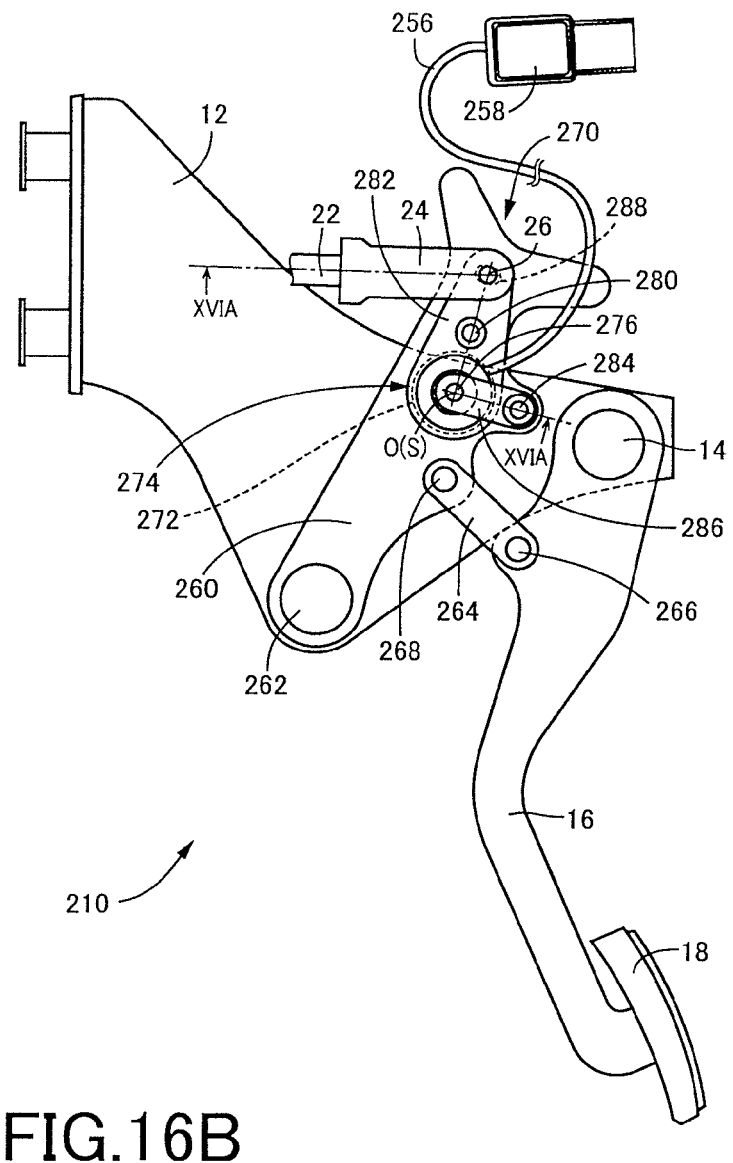
FIG. 16A is a front view.
Figure 16B:
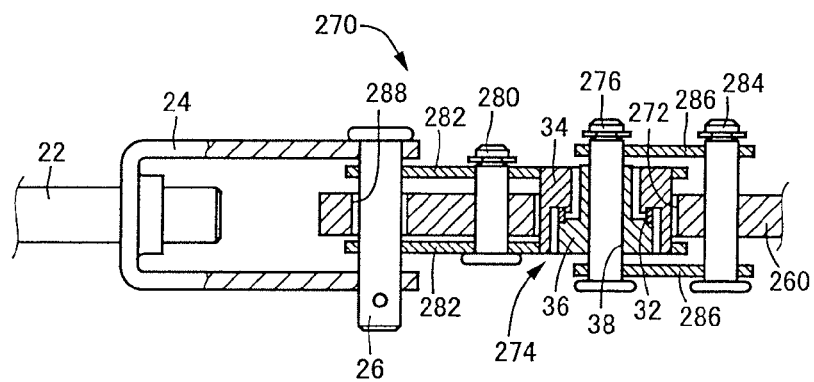
FIG. 16B is an enlarged cross-sectional view along line XVIA-XVIA of FIG. 16A.

FIG. 16 shows an operating pedal device 210 for a service brake of a vehicle. FIG. 16A is a front view (corresponding to a lateral view of the vehicle in the installed state of the device), and FIG. 16B is an enlarged cross-sectional view along line XVIA-XVIA of FIG. 16A. This vehicular operating pedal device 210 includes, different from the operating pedal device 200 shown in FIG. 25, an intermediate lever 260 which transmits the operating force from the operating pedal 16 to the operating rod 22. The intermediate lever 260 is pivotably disposed on the pedal support 12 by a supporting pin 262 parallel to the support shaft 14, and it is mechanically pivoted around the supporting pin 262 in accordance with the depressing operation of the operating pedal 16 connected thereto through a connecting link 264. The connecting link 264 has both longitudinal ends respectively connected relatively pivotably, that is pivotably connected relative, to the operating pedal 16 and to the intermediate lever 260 through a pair of linking pins 266 and 268 both being parallel to the support shaft 14.

To a top end of the intermediate lever 260, the operating rod 22 is connected relatively pivotably, that is pivotably connected relative through the pivotal movement connecting portion 270. In this embodiment, the intermediate lever 260 serving as the claimed sensor arranging member is provided with a sensor housing hole 272 extending therethrough in the axial direction, and the load sensor 274 is disposed in the sensor housing hole 272 with a predetermined clearance. The load sensor 274 structured substantially in the same way as the load sensor 30 mentioned above, includes the cylindrical deforming member 32, the annular member 34 serving as the claimed main body member, and the shaft-like member 36. Note that the annular member 34 projects at both axial ends thereof from both axial sides of the sensor housing hole 272, and the sensor pin 276 passing through the axis of the shaft-like member 36 is disposed to project at both axial ends thereof from both axial sides of the annular member 34. In this embodiment, the sensor pin 276 is formed independent from or separated from the shaft-like member 36, and is inserted into the through-hole 38 to be relatively pivotable. However, the sensor pin 276 may be constructed integrally with the shaft-like member 36.

The intermediate lever 260 is additionally provided with both a pivotal moving link 282 pivotably around a first supporting pin 280 parallel to the clevis pin 26, and a swinging lever 286 swingably on a second supporting pin 284 parallel to the clevis pin 26. The pivotal moving link 282 is pivotably supported in its intermediate position by the first supporting pin 280. The pivotal moving link 282 has both longitudinal ends, to one of which the operating rod 22 is connected relatively pivotably through the clevis pin 26, and to the other of which the annular member 34 of the load sensor 274 is integrally fixed by welding, for example.

The first supporting pin 280 and the clevis pin 26 are disposed, likewise the annular member 34, to pass through the intermediate lever 260 and to thereby project at both axial end from the both axial sides. A pair of pivotal moving links 282 respectively disposed on both sides of the intermediate lever 260 with intervening it therebetween, are connected to both axial ends of the first supporting pin 280 and to both axial ends of the clevis pin 26, and are integrally fixed to both axial ends of the annular member 34. The intermediate lever 260 has an arc or linear elongate hole 288 centering on the first supporting pin 280 in the disposed position of the clevis pin 26, which allows the pivotal moving link 282 to relatively pivot around the first supporting pin 280 by the reaction force of the operating rod 22. The clevis pin 26 corresponds to the claimed connecting pin of the pivotal movement connecting portion 270.

The swinging lever 286 has both longitudinal ends, one of which is pivotably supported by the second supporting pin 284, and to the other one of which the sensor pin 276 is connected relatively rotatable. The second supporting pin 284 has the following structure. In a front view seen from the direction of the center line O of the load sensor 274 (corresponding to a state of FIG. 16A), a straight line connecting the axis S of the shaft-like member 36 connected to the swinging lever 286 and the axis of the second supporting pin 284, and a straight line connecting the center of the annular member 34 fixed to the pivotal moving link 282 (corresponding to the center line O of the load sensor 274) and the axis of the first supporting pin 280, intersects at approximately right angle with each other. Additionally, the second supporting pin 284 is disposed at a position where the tensile force acts on the swinging lever 286 by relatively pivoting the pivotal moving link 282 around the first supporting pin 280 (i.e., clockwise in FIG. 16A) by the reaction force of the operating rod 22.

Therefore, the sensor pin 276 connected to the swinging lever 286 and the shaft-like member 36 in turn are kept at the substantially constant position of the intermediate lever 260 regardless of the reaction force of the operating rod 22. They displace relative to the annular member 34 that is pivoted around the first supporting pin 280 and displaced together with the pivotal moving link 282 by the reaction force of the operating rod 22. Using the shear deformation of the deforming member 32 by this relative displacement, the operating force of the operating pedal 16 is detected. The clearance of the sensor housing hole 272 and dimension of the elongated hole 288 are determined to allow the displacement of the annular member 34 resulting from the shear deformation of the deforming member 32, and the pivotal movement of the pivotal moving link 282. The second supporting pin 284 is disposed to pass through the intermediate lever 260 and to thereby project at both axial ends thereof from the both axial sides of the intermediate lever 260 similar to the sensor pin 276. A pair of swinging levers 286 disposed on both sides of the intermediate lever 260 with intervening it therebetween are connected to both axial ends of the second supporting pin 284 and to both axial ends of the sensor pin 276, respectively.

In the thus structured vehicular operating pedal device 210, the reaction force transmitted from the clevis pin 26 to the annular member 34 of the load sensor 274 through the pivotal moving link 282 is received by the second supporting pin 284 through the swinging lever 286. Therefore, with the depressing operation of the operating pedal 16, the pivotal moving link 282 is pivoted around the supporting pin 262 substantially integral with the intermediate lever 260. At this time, although the operating rod 22 and the intermediate lever 260 are pivoted around the axis of the clevis pin 26, the load always acts on the load sensor 274 in the substantially constant direction. The constant direction can be otherwise expressed as the direction perpendicular to a line segment connecting the sensor center line O and the axis of the first supporting pin 280 in the front view shown in FIG. 16A (i.e., substantially leftward in FIG. 16A). Therefore, the deformed part of the deforming member 32 is kept substantially constant.

Figure 17A:
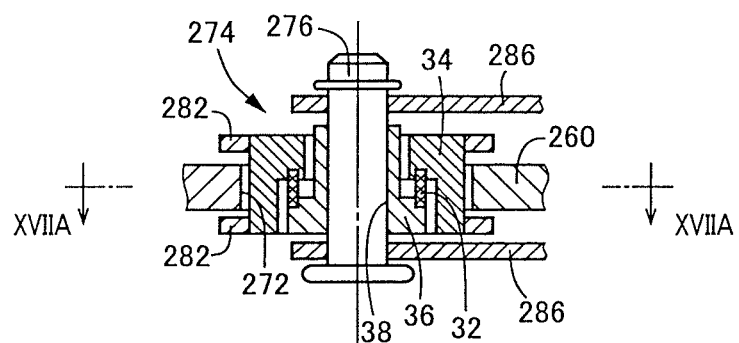
FIG. 17A is a longitudinal sectional view parallel to the center line O.
Figure 17B:
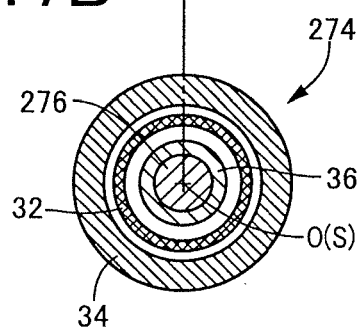
FIG. 17B is a cross-sectional view along line XVIIA-XVIIA of FIG. 17A.
Figure 18A:
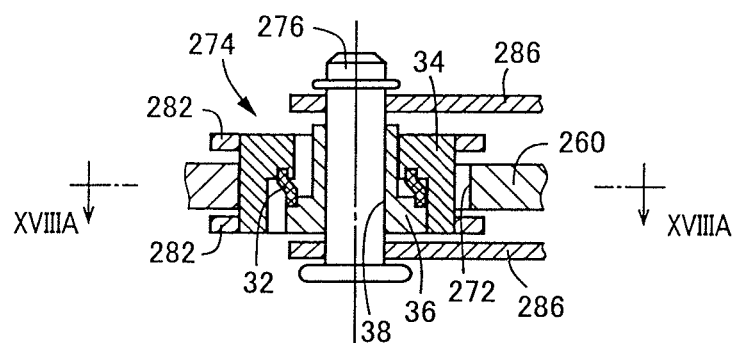
FIG. 18A is a longitudinal sectional view parallel to the center line O.
Figure 18B:
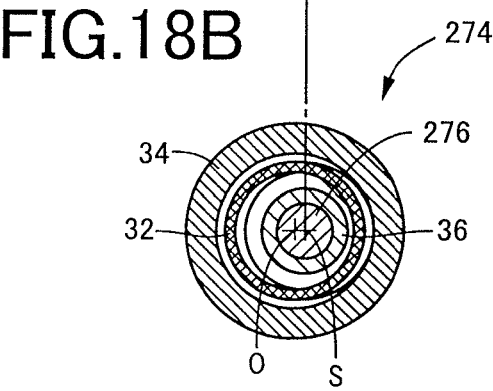
FIG. 18B is a cross-sectional view along line XVIIIA-XVIIIA of FIG. 18A.

FIG. 17A is a sectional view of the load sensor 274, in the front view (i.e., in the state of FIG. 16A) described above, in a direction perpendicular to a line segment connecting the sensor center line O and the axis of the first supporting pin 280, that is, in the longitudinal direction of the swinging lever 286. FIG. 17B is a cross-sectional view along line XVIIA-XVIIA of FIG. 17A. In FIG. 17, the sensor pin 276 is rotatable relative to both the shaft-like member 36 and the swinging lever 286. The deforming member 32 deforms as shown in FIGS. 18A and 18B in accordance with the depressing operation of the operating pedal 16. As a result, relative rotation occurs on the member having less friction, e.g., on the swinging lever 286, resulting in an extremely small rotation angle. To reduce friction, a bearing or the like can be provided if necessary. FIG. 18A and FIG. 18B correspond to FIG. 17A and FIG. 17B, respectively. FIG. 18B is a cross-sectional view along line XVIIIA-XVIIIA of FIG. 18A.

The annular member 34 and the shaft-like member 36 are connected together via the deforming member 32 in this way. If the radial load applied externally, i.e., in the direction perpendicular to the center line O is approximately zero, both the shaft-like member 36 and the sensor pin 276 are kept in a state where the axis S substantially coincides with the center line O of the load sensor 274 as shown in FIGS. 17A and 17B. The deforming member 32 is also kept in the cylindrical shape centering on the center line O over the entire length thereof. The center line O of the load sensor 274 corresponds to the center line of the annular member 34 which is the main body member.

On the other hand, if the reaction force of the operating rod 22 is applied to the annular member 34 via the pivotal moving link 82 in accordance with the depressing operation of the operating pedal 16, the radial load is applied between the annular member 34 and the shaft-like member 36. The radial load can be otherwise expressed as the load which relatively moves the annular member 34 leftward in FIGS. 17A and 17B (substantially leftward also in FIG. 16A). As a result, the deforming member 32 disposed therebetween undergoes the shear strain as shown in FIG. 18. An annular space is provided between the annular member 34 and the shaft-like member 36 to allow the relative movement therebetween and the shear deformation of the deforming member 32. The deforming member 32 is made of a metallic material such as ferritic stainless steel to be elastically deformed by receiving the load in the radial direction. Accordingly, the deforming member 32 undergoes the shear deformation according to the operating force generated by the depressing operation of the operating pedal 16. The deforming amount of the deforming member 32 is extremely small, not influencing on the depressing stroke of the operating pedal 16. However, for an easy understanding, the deforming amount thereof is exaggerated in the drawing as described above.

Figure 19A:
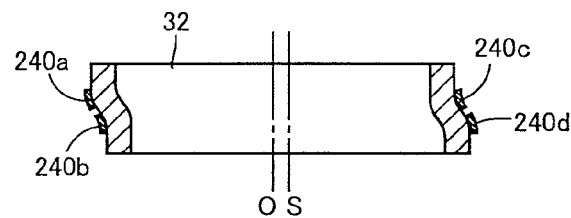
FIG. 19A is an enlarged cross-sectional view of the deforming member of FIG. 18A.
Figure 19B:
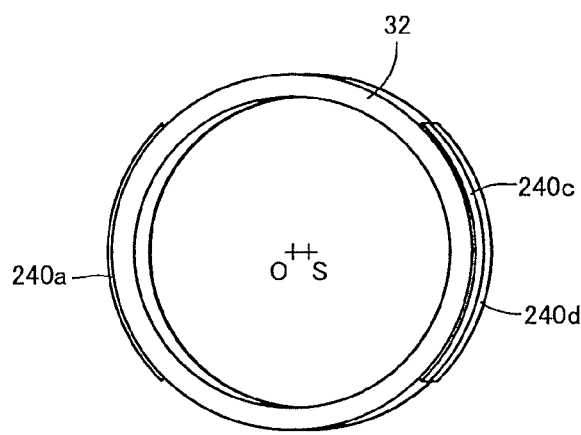
FIG. 19B is a plan view seen from above in FIG. 19A.
Figure 19C:
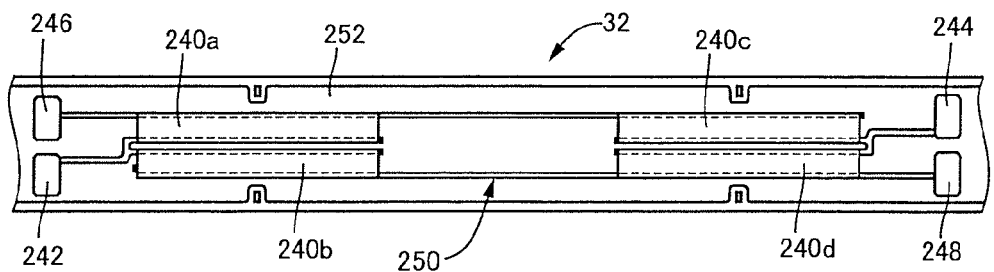
FIG. 19C is a development view of the deforming member, explaining a strain resistive element disposed on the outer circumferential surface thereof.

To detect the shear strain of the deforming member 32 as shown in FIG. 19, four strain resistive elements 240a to 240d serving as the claimed strain detecting elements are attached to the outer circumferential surface of the deforming member 32. For example, thin-film or thick-film semiconductor strain gauges or generally-used strain gauges are used as desirable examples for the strain resistive elements 240a to 240d. FIG. 19A, corresponding to FIG. 18A, shows a state where the deforming member 32 has undergone the shear deformation. FIG. 19B is a plan view seen from above in FIG. 19A, and FIG. 19C is a development view of the outer circumferential surface of the deforming member 32.

The four strain resistive elements 240a to 240d are located at two symmetrically positions on the deforming member 32 with intervening the center line O (S) therebetween, in a direction where the deforming member 32 causes the shear strain by the externally applied load. At each of the two symmetrical positions, one strain resistive element is located at a part to be undergone an axial tensile deformation by the shear strain, other strain resistive element is located at a part to be undergone an axial compression deformation by the shear strain. One and the other strain resistive elements are spaced.

In this embodiment, the direction of the load acting on the load sensor 274 via the pivotal moving link 282 is set to be substantially constant. Specifically, the direction thereof is set to be rightward and leftward in FIG. 16A, and to be rightward and leftward in FIGS. 17A and 17B, FIGS. 18A and 18B, and FIGS. 19A and 19B. Therefore, the strain resistive elements 240a to 240d are not required to be large in size. However, in consideration of an assembling workability of the deforming member 32 for example, each of the strain resistive elements 240a to 240d is long enough to cover an angular range of 90 degrees or so in the circumferential direction of the deforming member 32.

Figure 20:
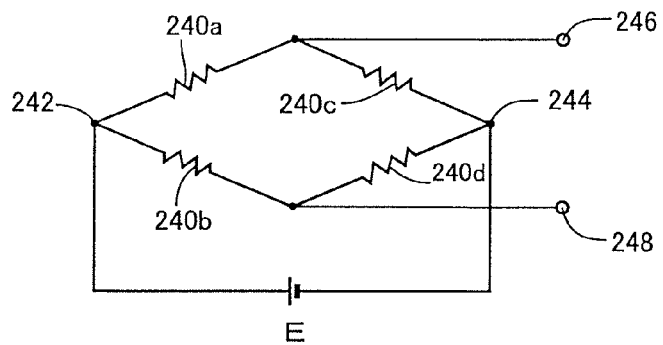
FIG. 20 is a circuit diagram showing a bridge circuit formed by connecting the strain resistive element shown in FIG. 19C by an electro-conductive circuit pattern.

By connecting these strain resistive elements 240a to 240d with an electro-conductive circuit pattern 250 (see FIG. 19C), a bridge circuit shown in FIG. 20 is constructed. A power source E is connected between a power source electrode 242 and a GND (ground) electrode 244 of the electro-conductive circuit pattern 250, so that an electric signal corresponding to the strain is output from between a pair of output electrodes 246 and 248. To connect the power source E to the power source electrode 242, or to take out an electric signal output from the output electrodes 246 and 248, the wire harness 256 (see FIG. 16A) is connected to these electrodes. This wire harness 256 extended from the load sensor 274, is connected through the connector 258 to a control circuit unit of the vehicle. On the outer circumferential surface of the deforming member 32, an insulation film 252 (see FIG. 19C) such as a glass paste is disposed in advance. The electro-conductive circuit pattern 250 is formed on the insulation film 252 by using a conductive material such as silver. Further, the strain resistive elements 240a to 240d are integrally formed by firing for example, to be come into contact, at a part thereof, with the electro-conductive circuit pattern 250. A control circuit unit may be provided in the load sensor 274. Instead of the full bridge circuit used in this embodiment, a half bridge circuit may be used for example, when using a deforming member in which only a part receiving the load based on the operating force of the operating pedal 16 is formed in an arc shape.

In the thus structured vehicular operating pedal device 210, the load sensor 274 electrically detecting the operating force based on the relative displacement between the annular member 34 and the shaft-like member 36 is disposed at the pivotal movement connecting portion 270 relatively pivotably connecting the intermediate lever 260 and the operating rod 22 relatively. The load sensor 274 detects the operating force transmitted through the clevis pin 26 of the pivotal connecting portion 270. Disposing the load sensor 274 within the sensor housing hole 272 formed in the intermediate lever 260, can make the whole of the operating pedal device 210 simple and compact, does not influence on the installing conditions of conventional pedal devices. Additionally, the relating members such as the operating rod 22, the clevis 24 and the clevis pin 26, which are the same as that in the prior art can be used in this embodiment, resulting in the device structure which can be constructed at low cost.

On the other hand, to the pivotal moving link 282 disposed pivotably relative to the intermediate lever 260 around the first supporting pin 280 the clevis pin 26 is pivotably connected, and the swinging lever 286 is disposed swingably around the second supporting pin 284. The annular member 34 of the load sensor 274 is integrally fixed to the pivotal moving link 282, and the shaft-like member 36 is connected pivotably relative to the swinging lever 286 through the sensor pin 276. Therefore, even if the intermediate lever 260 and the operating rod 22 are relatively pivoted around the axis of the clevis pin 26 in accordance with the depressing operation of the operating pedal 16, the reaction force from the clevis pin 26 always acts on the load sensor 274 in the substantially constant direction by the pivotal moving link 282. As a result, the deformed part of the deforming member 32 is maintained constant, so that the detecting accuracy of the operating force is heightened, and variation in detecting accuracy is prevented, thus rendering the high reliability.

Connecting the shaft-like member 36 rotatably connected relatively to the swinging lever 286 through the sensor pin 276 can absorb dimensional errors or assembling errors, and can ease the required dimensional precision etc., so that the device can be produced at lower cost, compared with a case where the shaft-like member 36 is integrally fixed to the intermediate lever 260.

In this embodiment, the second supporting pin 284 is arranged as follows. It is arranged so that a straight line connecting the axis S of the shaft-like member 36 connected to the swinging lever 286 and the axis of the second supporting pin 284, and a straight line connecting the center (center line O) of the annular member 34 fixed to the pivotal moving link 282 and the axis of the first supporting pin 280, are intersected with each other at approximately right angle. That is, the second supporting pin 284 is disposed on or near the action line of the load (reaction force) applied from the clevis pin 26 to the load sensor 274 through the pivotal moving link 282. Therefore, the load is efficiently received by the second supporting pin 284, which results in the device having simple and compact structure, and being produced at low cost. The straight lines are not necessarily required to intersect at exactly right angle with each other. As long as both straight lines intersect with each other in the range of ±20 degrees with respect to the right angle, i.e., in the range from 70 degrees to 110 degrees, a sufficient effect can be obtained.

In this embodiment, the second supporting pin 284 is disposed so that the pivotal moving link 282 pivots clockwise around the first supporting pin 280 in accordance with the depressing operation of the operating pedal 16, based on which the tensile force acts on the swinging lever 286. Therefore, there is no fear that an excessive load acts on the swinging lever 286 or the second supporting pin 284, which results in the device having simple and compact structure, and being produced at low cost. In detail, if the second supporting pin 284 is disposed so that the compressive load acts on the swinging lever 286, that is, if the second supporting pin 284 is disposed on the left side of the load sensor 274 in FIG. 16A, following problem may be caused. That is, an excessive load may act on the swinging lever 286 or the second supporting pin 284 by a servo action of, for example, a toggle link mechanism, depending on the positional relationship of the second supporting pin 284 with the pivotal moving link 282.

In this embodiment, the intermediate lever 260 connected to the operating rod 22 relatively pivotably around the axis of the clevis pin 26 is used as the claimed sensor arranging member, and is provided with the load sensor 274 thereon. Therefore, the load sensor 274 can detect the final operating force (output) transmitted from the clevis pin 26 to the operating rod 22, and thus can detect the braking force generated according to an output from the operating rod 22 with high accuracy.

The load sensor 274 is disposed in the sensor housing hole 272 formed in the intermediate lever 260 with a predetermined clearance. Additionally, both the pair of pivotal moving links 282 and the pair of swinging levers 286 are respectively disposed on both axial sides of the plate-like intermediate lever 260, and are respectively connected to both axial ends of the sensor pin 276 passing through the axis of the annular member 34 or the axis of the shaft-like member 36. Therefore, with the rotational moment such as twist suppressed, the load sensor 274 operates stably, thus the detecting accuracy being further heightened.

Figure 21:
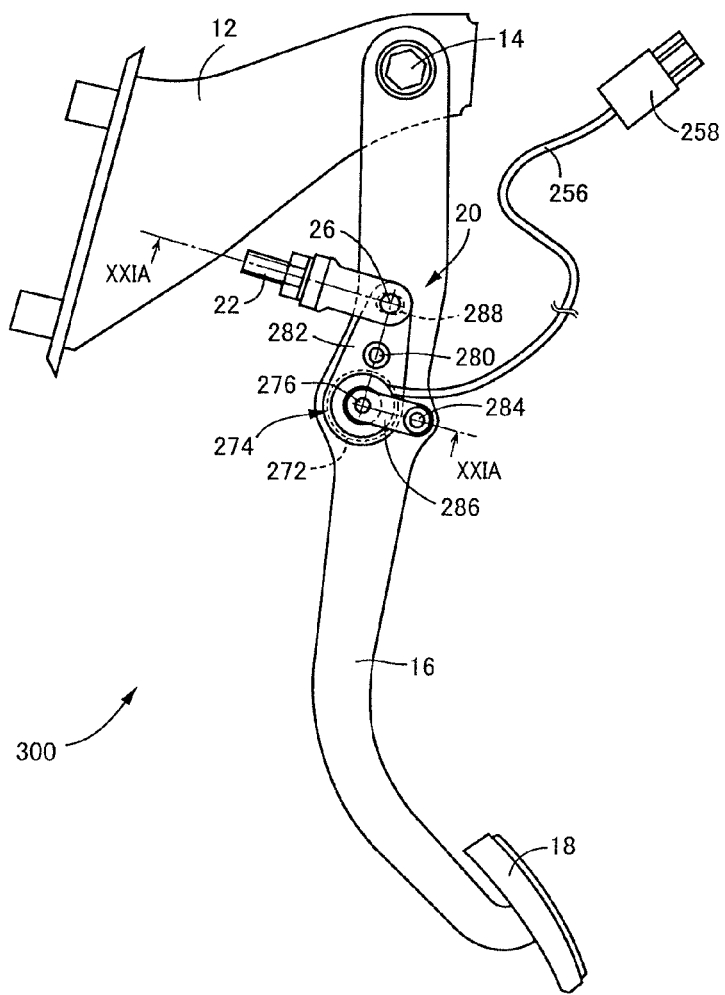
FIG. 21 is a front view, corresponding to FIG. 16A, showing another embodiment with no the intermediate lever being provided.
Figure 25A:
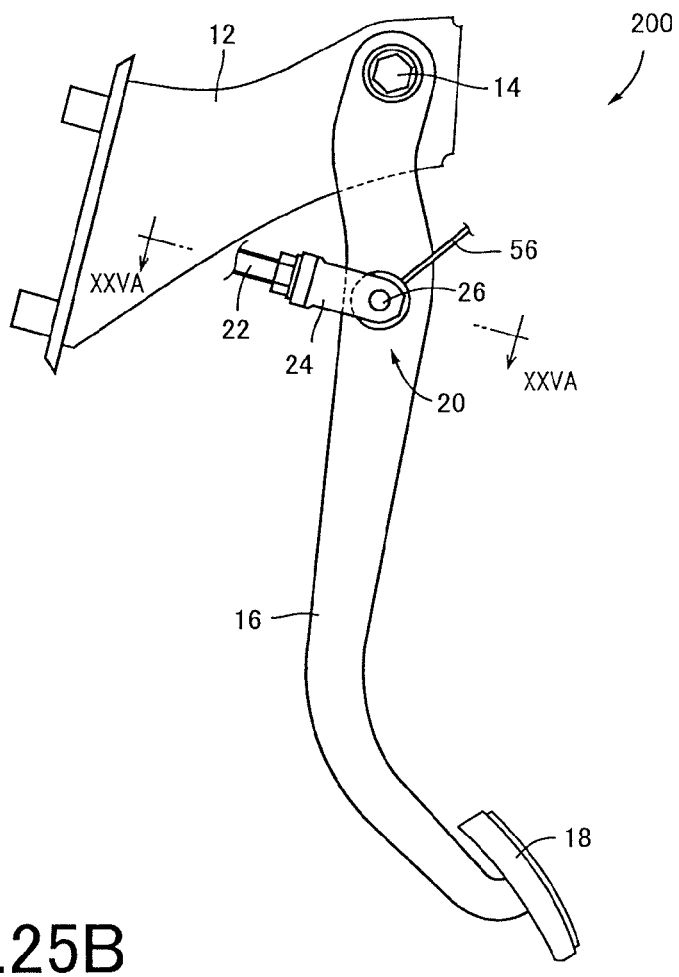
FIG. 25A is a front view of a vehicular operating pedal device with a load sensor having the same structure as that of FIG. 1.
Figure 25B:
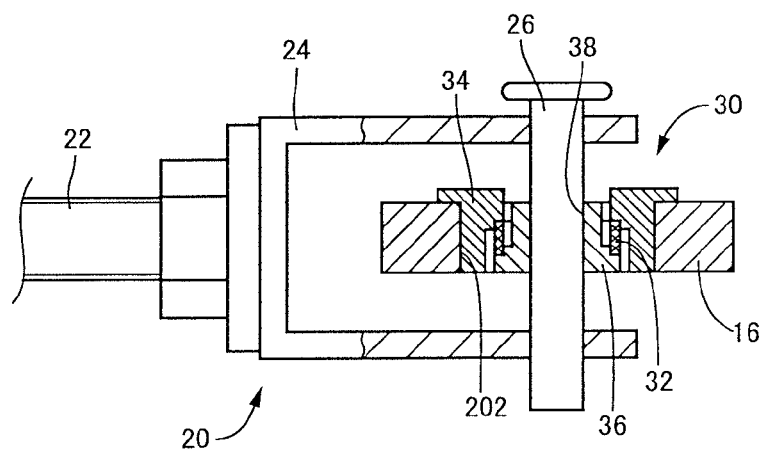
FIG. 25B is an enlarged cross-sectional view along line XXVA-XXVA of FIG. 25A.

FIG. 21 shows a vehicular operating pedal device 300 according to another embodiment in which the present invention is applied to the operating pedal device 200 of FIG. 25. In this embodiment, the pivotal movement connecting portion 20 is structured likewise the pivotal movement connecting portion 270. In detail, the operating pedal 16 has the sensor housing hole 272 and the elongated hole 288. The load sensor 274 is disposed in the sensor housing hole 272 with a clearance, and the clevis pin 26 is inserted into the elongated hole 288. On the operating pedal 16, the pivotal moving link 282 disposed pivotably around the first supporting pin 280 and the swinging lever 286 is disposed pivotably around the second supporting pin 284.

The pivotal moving link 282 has one longitudinal end to which the clevis pin 26 is connected relatively rotatably, and the other longitudinal end to which the annular member 34 of the load sensor 274 is integrally fixed. The sensor pin 276 inserted along the axis of the shaft-like member 36 of the load sensor 274 is pivotably connected relative to the swinging lever 286. Therefore, this embodiment can render the same operation and effect as that in the above-mentioned embodiments. The cross-section along line XXIA-XXIA of FIG. 21 corresponding to a structure in which the intermediate lever 260 is replaced with the operating pedal 16, in FIG. 16B. The operating pedal 16 corresponds to the claimed sensor arranging member.

A vehicular operating pedal device 310 shown in FIG. 22 differs in the disposing position of the load sensor 274 from the vehicular operating pedal device 210. In a pivotal movement connecting portion 312 in which the connecting link 264 is connected to the intermediate lever 260 through the linking pin 268, the intermediate lever 260 is provided with the load sensor 274 to detect an operating force transmitted from the linking pin 268 to the intermediate lever 260. In more detail, the intermediate lever 260 has a sensor housing hole 314 and an elongated hole 316. The load sensor 274 is disposed in the sensor housing hole 314 with a predetermined clearance, and the linking pin 268 is inserted into the elongated hole 316.

Figure 22A:
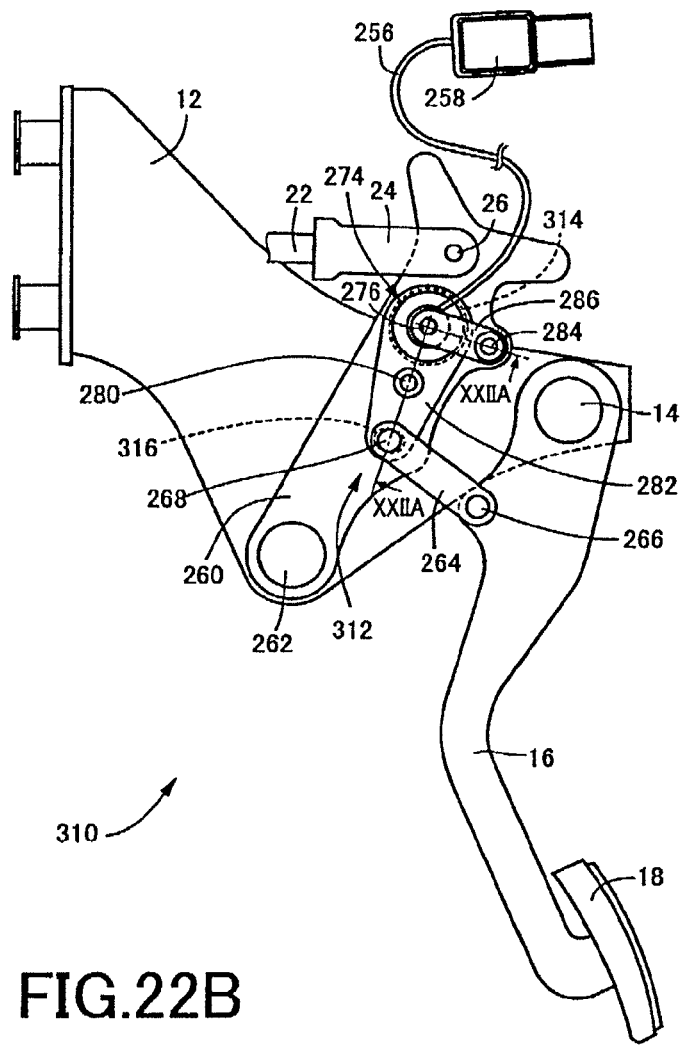
FIG. 22A is a front view corresponding to FIG. 16A.
Figure 22B:
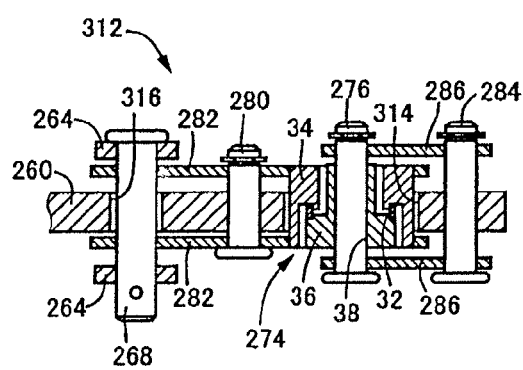
FIG. 22B is an enlarged cross-sectional view along line XXIIA-XXIIA of FIG. 22A.

On the intermediate lever 260, the pivotal moving link 282 is disposed pivotably around the first supporting pin 280 and the swinging lever 286 is disposed pivotably around the second supporting pin 284. The pivotal moving link 282 has one longitudinal end to which the linking pin 268 is relatively pivotably connected, and the other longitudinal end to which the annular member 34 of the load sensor 274 is integrally fixed. The linking pin 268 corresponds to the claimed connecting pin of the pivotal movement connecting portion 312. The sensor pin 276 inserted along the axis of the shaft-like member 36 of the load sensor 274 is relatively rotatably connected to the swinging lever 286. FIG. 22A and FIG. 22B correspond to FIG. 16A and FIG. 16B, respectively. FIG. 22A is a front view, and FIG. 22B is an enlarged cross-sectional view along line XXIIA-XXIIA of FIG. 22A.

This embodiment can render the same operation and effect as that in the embodiment of FIGS. 16A and 16B, except the following point. The different feature is that, with the operating pedal 16 depressed, the pivotal moving link 282 pivots clockwise around the first supporting pin 280 by the reaction force of the operating rod 22, so that the compressive load acts on the swinging lever 286.

As described above, the compressive load acts on the swinging lever 286. Herein, the second supporting pin 284 is disposed so that a straight line connecting the axis S of the shaft-like member 36 connected to the swinging lever 286 and the axis of the second supporting pin 284, and a straight line connecting the center (center line O) of the annular member 34 fixed to the pivotal moving link 282 and the axis of the first supporting pin 280 in the front view of FIG. 22A, intersect with each other at approximately right angle. In detail, the second supporting pin 284 is disposed on or near the action line of a load (operating force) applied from the linking pin 268 to the load sensor 274 through the pivotal moving link 282. Therefore, there is no fear that an excessive load acts on the swinging lever 286 or the second supporting pin 284 by a servo action of a toggle link mechanism for example, and the device can be structured simple, compact, and low in cost. If the second supporting pin 284 is disposed on the left side of the load sensor 274 in FIG. 22A, the tensile force can act on the swinging lever 286 as that in the above-mentioned embodiments.

The present invention can be applied to the pivotal movement connecting portion in which the connecting link 264 is pivotably connected relative to the operating pedal 16 through the linking pin 266, or to the pivotal movement connecting portion in which the intermediate lever 260 is pivotably attached to the pedal support 12 through the supporting pin 262. In these examples, the load acting on the linking pin 266 or on the supporting pin 262 is detected as the operating force.

Figure 23A:
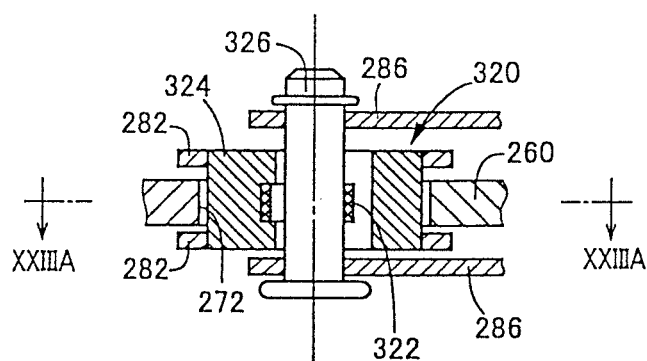
FIG. 23A is a longitudinal sectional view parallel to the center line O.
Figure 23B:
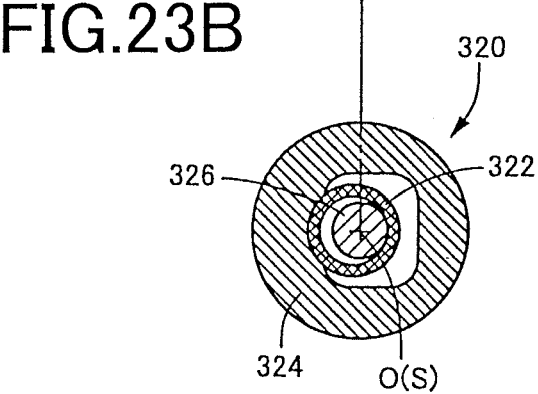
FIG. 23B is a cross-sectional view along line XXIIIA-XXIIIA of FIG. 23A.
Figure 24A:
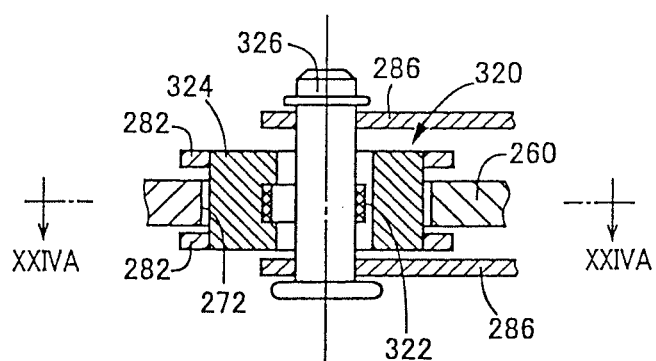
FIG. 24A is a longitudinal sectional view parallel to the center line O.
Figure 24B:
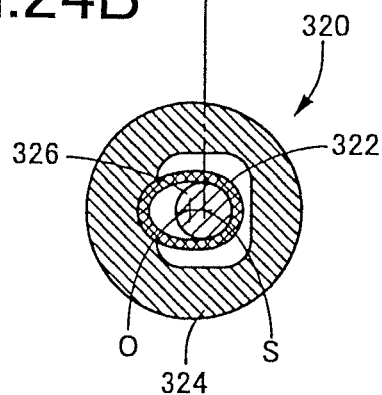
FIG. 24B is a cross-sectional view along line XXIVA-XXIVA of FIG. 24A.

FIG. 23 and FIG. 24 are sectional views corresponding to those of FIG. 17 and FIG. 18, respectively, showing a load sensor 320 used instead of the load sensor 274 in the embodiment of FIG. 16. FIG. 23A and FIG. 24A are longitudinal sectional views parallel to the center line O. FIG. 23B and FIG. 24B are cross-sectional views along line XXIIIA-XXIIIA of FIG. 23A and line XXIVA-XXIVA of FIG. 24A, respectively. The load sensor 320 includes a cylindrical deforming member 322 that detects a load applied in the radial direction thereof. An annular member 324 disposed radially outwardly of the deforming member 322, in the sensor housing hole 272 with a clearance, is integrally fixed to the pivotal moving link 282. The annular member 324 integrally holds a part of the deforming member 322 around the center line (i.e., a left sidewall part shown in FIG. 23 and FIG. 24) by welding for example. The shaft-like member 326 inserted into the cylindrical hole of the deforming member 322, is rotatably connected relative to the swinging levers 286. The sensor pin 276 can be used as the shaft-like member 326. The annular member 324 corresponds to the claimed main body member.

When the externally applied load is approximately zero, the load sensor 320 is held so that the annular member 324 is substantially concentric with the axis S of the shaft-like member 326 as shown in FIG. 23. The deforming member 322 is held to be eccentric with respect to the axis S so that the sidewall part thereof on the side opposite to the side fixed to the annular member 324, i.e., on the right side in FIG. 23 substantially contacts with the shaft-like member 126 on the inner circumferential surface thereof. This state is provided by pressing the operating rod 22 rightward in FIG. 16A by the action of a return spring (not shown) for example, and by causing the operating pedal 16 to contact with the stopper (not shown) to be located in the initial position. In this state, the deforming member 322 assumes a cylindrical shape having a substantially true circle.

On the other hand, when the radial load is applied between the annular member 324 and the shaft-like member 326 by the reaction force of the operating rod 22 in accordance with the depressing operation of the operating pedal 16, the annular member 324 displaces relative to the shaft-like member 326 leftward in FIG. 23 and FIG. 24. As a result, the deforming member 322 is stretched and deformed into an oval as shown in FIG. 24. The annular member 324 has the annular internal space of size to allow the relative displacement to the shaft-like member 326 or the tensile deformation of the deforming member 322. The deforming member 322 made of a metallic material such as ferritic stainless steel, which can be elastically deformed by receiving the radial load, undergoes tensile deformation according to an operating force generated by the depressing operation of the operating pedal 16.

To detect the tensile strain of the deforming member 322, strain resistive elements serving as the strain detecting element are fixed on the outer peripheral surface of the deforming member 322 to upper and lower sidewall parts in FIG. 24B, i.e., to parts at which tensile deformation is caused. As that in the above embodiments, the insulation film such as a glass paste, is in advance disposed on the outer circumferential surface of the deforming member 322. The electro-conductive circuit pattern is formed on the insulation film by using the conductive material such as silver. The strain resistive elements are further formed integrally with the electro-conductive circuit pattern by firing for example to be partially contacted with the electro-conductive circuit pattern.

The size and the disposing position of the strain resistive element are appropriately selected in consideration of, for example, assembling workability. In the present invention, the load always acting in the substantially constant direction deforms a substantially given part of the deforming member 322, regardless of the depressed amount of operating pedal 16. Therefore, the high detecting accuracy can be stably obtained even when comparatively small deformation is caused.

Even in the embodiments shown in FIG. 21, FIG. 22A, and FIG. 22B, the load sensor 320 can be likewise used instead of the load sensor 274.

The embodiments of the present invention have been described in detail as above with reference to the attached drawings. Noted that the present invention is never limited to these embodiments, but can be embodied in variously modified or improved mode based on ordinary knowledge of a person skilled in the art.

What is claimed is:

1. A vehicular operating pedal device with a load sensor, comprising:
    an operating pedal movably disposed on a pedal support fixed to a vehicle and depressed by a driver;
    a reaction force member to which an operating force of the operating pedal is transmitted and on which a reaction force corresponding to the operating force is acted;
    a pivotal movement connecting portion placed between the operating pedal and the reaction force member, connecting a pair of members about a connecting pin relatively pivotable, and transmitting the operating force through the connecting pin;

a load sensor, disposed in a sensor housing hole with a predetermined clearance formed in a sensor arranging member in the pivotal movement connecting portion to receive a load in a predetermined direction for electrically detecting the operating force, regardless of variation of the direction of the reaction force relative to the operating pedal input from the reaction force member in accordance with a depression of the operating pedal, the load sensor including a shaft member, a main body member disposed to be relatively displaced to the shaft member in a direction perpendicular to an axis thereof, a deforming member spanned over the shaft member and the main body member, and strain detecting elements fixed to the deforming member and detecting a deformation caused in the deforming member by allowing relative displacement between the shaft member and the main body member in the direction perpendicular to the axis of the shaft member based on the reaction force;

a pivotal moving link disposed on the sensor arranging member to be pivotable around a first supporting pin parallel to the connecting pin in the pivotal movement connecting portion, the pivotal moving link connected relatively pivotable to the connecting pin that is inserted into an elongated hole formed in the sensor arranging member to be displaceable relative to the sensor arranging member, and connected to one of the shaft member and the main body member of the load sensor to be pivoted around the first supporting pin by the operating force applied from the connecting pin or by the reaction force; and a swinging lever disposed on the sensor arranging member, connected to a second supporting pin parallel to the connecting pin to be swingable around the second supporting pin, and connected to the other of the shaft member and the main body.

2. The vehicular operating pedal device with the load sensor according to claim 1, wherein, when viewed from a direction of the axis of the first supporting pin, the second supporting pin is disposed such that a straight line connecting an axis of the second supporting pin and an axis of the other of the main body member and the shaft member connected to the swinging lever, intersects with a straight line connecting an axis of the first supporting pin and an axis of the one of the main body member and the shaft member connected to the pivotal moving link at a substantially right angle.

3. The vehicular operating pedal device with the load sensor according to claim 1, wherein the second supporting pin is disposed at a position where, with the pivotal moving link pivoted around the first supporting pin in accordance with a depression of the operating pedal, a tensile force is acted on the swinging lever.

4. The vehicular operating pedal device with the load sensor according to claim 1, wherein the sensor arranging member is a plate shaped member pivotably connected relative to the reaction force member through the pivotal movement connecting portion, and is provided with the sensor housing hole passing therethrough;

the main body member projects from both axial sides of the sensor housing hole, and a sensor pin passing through the axis of the shaft member is disposed to project from both axial sides of the main body member;

the pivotal moving link is a first pivotal moving link;

the swinging lever is a first swinging lever;

the vehicular operating pedal device further includes a second pivotal moving link and a second swinging lever; and the first and second pivotal moving links and the first and second swinging levers are disposed at both sides of the sensor arranging member, respectively, and are connected to both axial ends of the main body member or the sensor pin, respectively.

5. The vehicular operating pedal device with the load sensor according to claim 1, wherein the operating pedal is disposed on the pedal support pivotably around a supporting axis, and the operating pedal serves as the sensor arranging member.

6. The vehicular operating pedal device with the load sensor according to claim 1, further comprising an intermediate lever disposed pivotably on the pedal support, connected to the operating pedal through a connecting link, and pivotally connected relative to the reaction force member through the pivotal movement connecting portion, and the intermediate lever serves as the sensor arranging member.

7. The vehicular operating pedal device with the load sensor according to claim 1, wherein the deforming member has a hollow cylindrical shape;

one axial end and the other axial end of the cylindrical deforming member are integrally fixed to the main body member and the shaft member, respectively; and the strain detecting elements detect a shear strain caused in the deforming member based on the relative displacement between the main body member and the shaft member by the reaction force.

8. An operating device with a load sensor, comprising:

an operating member that is moved to be operated, wherein the operating member is an operating pedal;

a reaction force member to which an operating force of the operating member is transmitted and on which a reaction force corresponding to the operating force is acted;

at least one pivotal movement connecting portion, placed between the operating member and the reaction force member, to connect a pair of members about a connecting pin relatively pivotable, and to transmit the operating force through the connecting pin;

a load sensor disposed in a sensory housing hole with a predetermined clearance formed in a sensor arranging member that is one of the pair of members to be connected through the connecting pin, electrically detecting the operating force, and including a shaft member, a main body member disposed to be relatively displaced to the shaft member in a direction perpendicular to an axis thereof, a deforming member spanned over the shaft member and the main body member, and strain detecting elements fixed to the deforming member, the strain detecting elements detecting a deformation caused in the deforming member by allowing a relative displacement between the shaft member and the main body member in the direction perpendicular to the axis of the shaft member based on the reaction force;

at least one pivotal moving link disposed on the sensor arranging member to be pivotable around a first supporting pin parallel to the connecting pin in the pivotal movement connecting portion, the pivotal moving link connected relatively pivotable to the connecting pin that is inserted into an elongated hole formed in the sensor arranging member to be displaceable relative to the sensor arranging member, and connected to one of the shaft member and the main bed member of the load sensor to be pivoted around the first supporting pin by the operating force applied from the connecting pin or by the reaction force; and a swinging lever disposed on the sensor arranging member, connected to a second supporting pin parallel to the connecting pin to be swingable around the second supporting pin, and connected to the other of the shaft member and the main member.

* * * * *